United States Patent
Montemurro et al.

(10) Patent No.: US 10,681,757 B2
(45) Date of Patent: *Jun. 9, 2020

(54) METHOD AND APPARATUS FOR PEER-TO-PEER COMMUNICATIONS IN A WIRELESS LOCAL AREA NETWORK INCLUDING THE NEGOTIATION AND ESTABLISHMENT OF A PEER-TO-PEER CONNECTION BETWEEN PEERS BASED ON CAPABILITY INFORMATION

(71) Applicant: BlackBerry Limited, Waterloo (CA)

(72) Inventors: Michael Peter Montemurro, Toronto (CA); Brian Edward Anthony McColgan, Toronto (CA); Stephen McCann, Southampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,811

(22) Filed: Apr. 16, 2018

(65) Prior Publication Data

US 2018/0235021 A1     Aug. 16, 2018

Related U.S. Application Data

(63) Continuation of application No. 12/868,550, filed on Aug. 25, 2010, now Pat. No. 9,949,305.

(Continued)

(51) Int. Cl.
*H04W 76/14* (2018.01)
*H04L 29/08* (2006.01)
(Continued)

(52) U.S. Cl.
CPC ......... *H04W 76/14* (2018.02); *H04L 61/1541* (2013.01); *H04L 67/104* (2013.01);
(Continued)

(58) Field of Classification Search
CPC . H04W 76/14; H04W 72/0406; H04W 8/005; H04L 67/1068; H04L 67/1061; H04L 67/104; H04L 61/1541; H04L 69/24
See application file for complete search history.

(56) References Cited

U.S. PATENT DOCUMENTS

| | | | |
|---|---|---|---|
| 5,790,553 A | 8/1998 | Deaton et al. | |
| 6,014,102 A * | 1/2000 | Mitzlaff | G01S 5/02 342/357.31 |

(Continued)

FOREIGN PATENT DOCUMENTS

| | | |
|---|---|---|
| CN | 1925444 | 3/2007 |
| CN | 101237364 | 8/2008 |

(Continued)

OTHER PUBLICATIONS

India Office Action issued in Indian Application No. 2890/CHENP/2012, dated May 25, 2018, 7 pages.

(Continued)

*Primary Examiner* — Daniel C. Murray
(74) *Attorney, Agent, or Firm* — Fish & Richardson P.C.

(57) ABSTRACT

A method and device for peer-to-peer communications is provided. The method includes communication of the capabilities of a device to another device or network component. A peer to peer communication is established based on at least one of the capabilities of the device. The method may also include utilizing a control point or access point in conveying the capabilities of the device to another device.

9 Claims, 22 Drawing Sheets

Related U.S. Application Data

(60) Provisional application No. 61/248,328, filed on Oct. 2, 2009.

(51) Int. Cl.
*H04W 72/04* (2009.01)
*H04L 29/12* (2006.01)
*H04L 29/06* (2006.01)
*H04W 8/00* (2009.01)

(52) U.S. Cl.
CPC ...... *H04L 67/1061* (2013.01); *H04L 67/1068* (2013.01); *H04L 69/24* (2013.01); *H04W 72/0406* (2013.01); *H04W 8/005* (2013.01)

(56) References Cited

U.S. PATENT DOCUMENTS

| | | | |
|---|---|---|---|
| 6,069,896 A | 5/2000 | Borgstahl et al. | |
| 6,108,704 A | 8/2000 | Hutton et al. | |
| 6,123,259 A | 9/2000 | Ogasawara | |
| 6,131,121 A | 10/2000 | Mattaway et al. | |
| 6,513,066 B1 | 1/2003 | Hutton et al. | |
| 6,665,611 B1 * | 12/2003 | Oran | G01S 5/0027 455/404.2 |
| 6,687,738 B1 | 2/2004 | Hutton et al. | |
| 6,701,365 B1 | 3/2004 | Hutton et al. | |
| 6,806,830 B2 * | 10/2004 | Panasik | G01C 21/206 342/386 |
| 6,829,645 B1 | 12/2004 | Hutton et al. | |
| 6,943,905 B2 | 9/2005 | Ferlitsch | |
| 6,950,427 B1 | 9/2005 | Zinin | |
| 7,065,579 B2 | 6/2006 | Traversat et al. | |
| 7,103,040 B2 * | 9/2006 | Aalbers | H04L 29/06 370/388 |
| 7,136,927 B2 | 11/2006 | Traversat et al. | |
| 7,139,809 B2 | 11/2006 | Husain et al. | |
| 7,149,499 B1 * | 12/2006 | Oran | H04M 11/04 455/404.2 |
| 7,167,920 B2 | 1/2007 | Traversat et al. | |
| 7,194,354 B1 * | 3/2007 | Oran | G01S 5/0027 370/351 |
| 7,197,565 B2 | 3/2007 | Abdelaziz et al. | |
| 7,206,841 B2 | 4/2007 | Traversat et al. | |
| 7,251,235 B2 | 7/2007 | Wentink | |
| 7,263,560 B2 | 8/2007 | Abdelaziz et al. | |
| 7,269,169 B1 | 9/2007 | Venkataraman | |
| 7,315,886 B1 | 1/2008 | Meenan et al. | |
| 7,340,500 B2 | 3/2008 | Traversat et al. | |
| 7,370,083 B2 | 5/2008 | Husain et al. | |
| 7,370,336 B2 | 5/2008 | Husain et al. | |
| 7,398,327 B2 | 7/2008 | Lee | |
| 7,401,152 B2 | 7/2008 | Traversat et al. | |
| 7,401,153 B2 | 7/2008 | Traversat et al. | |
| 7,414,981 B2 | 8/2008 | Jaramillo et al. | |
| 7,430,616 B2 | 9/2008 | Husain et al. | |
| 7,433,326 B2 | 10/2008 | Desai | |
| 7,434,220 B2 | 10/2008 | Husain et al. | |
| 7,464,168 B1 | 12/2008 | Abdelaziz et al. | |
| 7,478,173 B1 | 1/2009 | Delco | |
| 7,486,695 B1 * | 2/2009 | AbdelAziz | H04L 12/4633 370/338 |
| 7,493,371 B1 | 2/2009 | Bali et al. | |
| 7,533,172 B2 | 5/2009 | Traversat et al. | |
| 7,571,227 B1 | 8/2009 | Pabla | |
| 7,574,523 B2 | 8/2009 | Traversat et al. | |
| 7,581,010 B2 | 8/2009 | Guo et al. | |
| 7,643,491 B2 | 1/2010 | Teodosiu et al. | |
| 7,657,612 B2 | 2/2010 | Manchester | |
| 7,734,751 B2 | 6/2010 | Donescu et al. | |
| 7,756,928 B1 | 7/2010 | Meenan et al. | |
| 7,778,162 B2 | 8/2010 | Yu | |
| 7,849,140 B2 | 12/2010 | Abdel-Aziz et al. | |
| 7,925,781 B1 | 4/2011 | Chan et al. | |
| 7,929,452 B2 | 4/2011 | Diamant et al. | |
| 7,990,896 B1 | 8/2011 | Delker et al. | |
| 7,991,855 B2 | 8/2011 | Kubsch et al. | |
| 8,010,778 B2 | 8/2011 | Zhao et al. | |
| 8,077,683 B2 | 12/2011 | Rudolf et al. | |
| 8,082,303 B2 | 12/2011 | Laroia et al. | |
| RE43,127 E | 1/2012 | Wentink | |
| 8,095,596 B2 | 1/2012 | Meenan et al. | |
| 8,116,323 B1 | 2/2012 | Evans et al. | |
| 8,159,999 B2 | 4/2012 | Chandra et al. | |
| 8,165,034 B2 * | 4/2012 | Buchwald | H04W 4/02 342/357.2 |
| 8,194,600 B2 | 6/2012 | Nagaraja | |
| 8,203,985 B2 | 6/2012 | Gong et al. | |
| 8,208,451 B2 | 6/2012 | Seok | |
| 8,391,266 B2 | 3/2013 | Seok | |
| 8,477,649 B2 | 7/2013 | Diamant et al. | |
| 8,565,207 B2 | 10/2013 | Seok | |
| 8,582,566 B2 | 11/2013 | Bae | |
| 8,605,624 B2 | 12/2013 | Desai | |
| 8,768,323 B2 | 7/2014 | Liu | |
| 8,769,108 B2 | 7/2014 | Meylemans et al. | |
| 8,838,752 B2 | 9/2014 | Lor et al. | |
| RE45,212 E | 10/2014 | Wentink | |
| 8,856,736 B2 | 10/2014 | Khare et al. | |
| 9,363,709 B2 | 6/2016 | Vasisht | |
| 10,335,059 B2 * | 7/2019 | Annegarn | A61B 5/1118 |
| 2002/0143855 A1 | 10/2002 | Traversat et al. | |
| 2002/0143944 A1 * | 10/2002 | Traversat | G06F 9/4416 709/225 |
| 2002/0143959 A1 | 10/2002 | El-Baze et al. | |
| 2002/0147771 A1 | 10/2002 | Traversat et al. | |
| 2002/0147810 A1 | 10/2002 | Traversat et al. | |
| 2002/0152299 A1 | 10/2002 | Traversat et al. | |
| 2002/0184310 A1 | 12/2002 | Traversat et al. | |
| 2002/0184311 A1 | 12/2002 | Traversat et al. | |
| 2002/0184357 A1 | 12/2002 | Traversat et al. | |
| 2002/0184358 A1 | 12/2002 | Traversat et al. | |
| 2002/0188657 A1 | 12/2002 | Traversat et al. | |
| 2003/0002521 A1 | 1/2003 | Traversat et al. | |
| 2003/0028585 A1 | 2/2003 | Yeager et al. | |
| 2003/0041141 A1 | 2/2003 | Abdelaziz et al. | |
| 2003/0055894 A1 | 3/2003 | Yeager et al. | |
| 2003/0055898 A1 | 3/2003 | Yeager et al. | |
| 2003/0070070 A1 | 4/2003 | Yeager et al. | |
| 2003/0105812 A1 | 6/2003 | Flowers et al. | |
| 2003/0117638 A1 | 6/2003 | Ferlitsch | |
| 2003/0120751 A1 | 6/2003 | Husain et al. | |
| 2003/0188010 A1 | 10/2003 | Raza | |
| 2003/0212827 A1 | 11/2003 | Saha | |
| 2004/0044727 A1 | 3/2004 | Abdelaziz et al. | |
| 2004/0064511 A1 | 4/2004 | Abdel-Aziz et al. | |
| 2004/0088369 A1 | 5/2004 | Yeager et al. | |
| 2004/0098458 A1 | 5/2004 | Husain et al. | |
| 2004/0098717 A1 | 5/2004 | Husain et al. | |
| 2004/0098729 A1 | 5/2004 | Husain et al. | |
| 2004/0100910 A1 | 5/2004 | Desai | |
| 2004/0104927 A1 | 6/2004 | Husain et al. | |
| 2004/0107420 A1 | 6/2004 | Husain et al. | |
| 2004/0133689 A1 | 7/2004 | Vasisht | |
| 2004/0148434 A1 | 7/2004 | Matsubara et al. | |
| 2004/0181517 A1 | 9/2004 | Jung | |
| 2004/0190042 A1 | 9/2004 | Ferlitsch et al. | |
| 2005/0015496 A1 | 1/2005 | Guo et al. | |
| 2005/0021793 A1 | 1/2005 | Kubsch et al. | |
| 2005/0036469 A1 | 2/2005 | Wentink | |
| 2005/0053093 A1 | 3/2005 | Fukushima et al. | |
| 2005/0060432 A1 | 3/2005 | Husain et al. | |
| 2005/0108427 A1 | 5/2005 | Delia | |
| 2005/0114534 A1 | 5/2005 | Lee | |
| 2005/0135286 A1 | 6/2005 | Nurminen | |
| 2005/0149626 A1 | 7/2005 | Manchester | |
| 2005/0174962 A1 | 8/2005 | Gurevich | |
| 2005/0229243 A1 | 10/2005 | Svendsen et al. | |
| 2006/0009235 A1 * | 1/2006 | Sheynblat | G01S 5/0036 455/456.1 |
| 2006/0010251 A1 | 1/2006 | Mrsic-Flogel et al. | |
| 2006/0123116 A1 | 6/2006 | Rahman et al. | |
| 2006/0155563 A1 | 7/2006 | Banerjee et al. | |
| 2006/0165035 A1 | 7/2006 | Chandra et al. | |

(56) References Cited

U.S. PATENT DOCUMENTS

| | | | |
|---|---|---|---|
| 2006/0217881 A1* | 9/2006 | Pei | G09B 29/10 |
| | | | 701/432 |
| 2006/0221998 A1 | 10/2006 | Livet et al. | |
| 2007/0002761 A1 | 1/2007 | Diamant et al. | |
| 2007/0067263 A1 | 3/2007 | Husain et al. | |
| 2007/0077945 A1* | 4/2007 | Sheynblat | G01S 5/0036 |
| | | | 455/456.5 |
| 2007/0097885 A1 | 5/2007 | Traversat et al. | |
| 2007/0104138 A1 | 5/2007 | Rudolf et al. | |
| 2007/0206610 A1 | 9/2007 | Teodosiu et al. | |
| 2007/0259651 A1 | 11/2007 | Bae | |
| 2008/0025208 A1 | 1/2008 | Chan | |
| 2008/0112351 A1 | 5/2008 | Surineni et al. | |
| 2008/0225810 A1* | 9/2008 | Buchwald | H04W 4/02 |
| | | | 370/338 |
| 2008/0281515 A1* | 11/2008 | Ann | G01C 21/20 |
| | | | 701/434 |
| 2008/0313698 A1 | 12/2008 | Zhao et al. | |
| 2008/0316942 A1 | 12/2008 | Desai | |
| 2009/0073945 A1 | 3/2009 | Seok | |
| 2009/0111378 A1 | 4/2009 | Sheynman et al. | |
| 2009/0146822 A1 | 6/2009 | Soliman | |
| 2009/0160711 A1* | 6/2009 | Mehta | G01S 5/0205 |
| | | | 342/450 |
| 2009/0233574 A1* | 9/2009 | Shinozaki | G01S 5/0263 |
| | | | 455/404.2 |
| 2009/0327391 A1 | 12/2009 | Park et al. | |
| 2010/0010643 A1* | 1/2010 | Pomerantz | H02J 3/14 |
| | | | 700/22 |
| 2010/0046523 A1 | 2/2010 | Mekkattuparamb An | |
| 2010/0109864 A1* | 5/2010 | Haartsen | G01C 21/206 |
| | | | 340/539.13 |
| 2010/0128695 A1 | 5/2010 | Nagaraja | |
| 2010/0128701 A1 | 5/2010 | Nagaraja | |
| 2010/0165896 A1 | 7/2010 | Gong et al. | |
| 2010/0250673 A1 | 9/2010 | Laroia et al. | |
| 2010/0250725 A1 | 9/2010 | Meenan et al. | |
| 2010/0254308 A1 | 10/2010 | Laroia et al. | |
| 2010/0278062 A1 | 11/2010 | Abraham | |
| 2010/0322213 A1 | 12/2010 | Liu | |
| 2010/0330915 A1 | 12/2010 | Parizhsky et al. | |
| 2010/0332662 A1 | 12/2010 | Meylemans et al. | |
| 2011/0034127 A1 | 2/2011 | Wentink et al. | |
| 2011/0038291 A1 | 2/2011 | Seok | |
| 2011/0040888 A1 | 2/2011 | Krishnaswamy et al. | |
| 2011/0082939 A1 | 4/2011 | Montemurro et al. | |
| 2011/0082940 A1 | 4/2011 | Montemurro et al. | |
| 2011/0103264 A1 | 5/2011 | Wentink | |
| 2011/0128972 A1 | 6/2011 | Thornton et al. | |
| 2011/0225305 A1 | 9/2011 | Vedantham et al. | |
| 2011/0234409 A1 | 9/2011 | Soliman | |
| 2011/0252238 A1 | 10/2011 | Abuan et al. | |
| 2011/0282989 A1 | 11/2011 | Geirhofer et al. | |
| 2011/0291884 A1* | 12/2011 | Oh | G01S 19/48 |
| | | | 342/357.31 |
| 2012/0054293 A1 | 3/2012 | Diamant et al. | |
| 2012/0076049 A1 | 3/2012 | Rudolf et al. | |
| 2012/0163261 A1 | 6/2012 | Vedantham et al. | |
| 2012/0224509 A1 | 9/2012 | Nagaraja | |
| 2012/0230316 A1 | 9/2012 | Seok | |
| 2012/0250576 A1 | 10/2012 | Rajamani et al. | |
| 2012/0290650 A1 | 11/2012 | Montuno et al. | |
| 2013/0142189 A1 | 6/2013 | Seok | |
| 2013/0166759 A1 | 6/2013 | Rajamani et al. | |
| 2013/0211718 A1* | 8/2013 | Yoo | G01C 21/206 |
| | | | 701/500 |
| 2013/0212204 A1* | 8/2013 | Kearney, III | H04W 4/021 |
| | | | 709/208 |
| 2014/0317309 A1 | 10/2014 | Vange et al. | |
| 2014/0334338 A1 | 11/2014 | Joo | |
| 2014/0351444 A1 | 11/2014 | Qi et al. | |
| 2014/0351446 A1 | 11/2014 | Cho et al. | |
| 2015/0304844 A1* | 10/2015 | Liang | H04W 12/06 |
| | | | 726/3 |
| 2019/0042845 A1* | 2/2019 | Perkins | G06F 16/58 |
| 2019/0297485 A1* | 9/2019 | Baldree | H04W 4/80 |

FOREIGN PATENT DOCUMENTS

| | | |
|---|---|---|
| CN | 101313527 | 11/2008 |
| CN | 101330427 | 12/2008 |
| CN | 101409729 | 4/2009 |
| CN | 101668029 | 3/2010 |
| JP | 2007060029 | 3/2007 |
| JP | 2009527136 | 7/2009 |
| KR | 20080067092 | 7/2008 |
| WO | 2001/15387 | 3/2001 |
| WO | 2005/053347 | 6/2005 |
| WO | 2007/055993 | 5/2007 |
| WO | 2007/095396 | 8/2007 |
| WO | 2009/083820 | 7/2009 |

OTHER PUBLICATIONS

Communication Pursuant to Article 94(3) EPC issued in European Application No. 10773399.0 dated Dec. 4, 2018, 5 pages.

Notice of Allowance issued in Canadian Application No. 2,776,016 dated Jun. 14, 2018, 5 pages.

"Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 6: Extensions to Direct Link Setup 19 (DLS)," IEEE P802.11z™/ D5.0, Jun. 2009 (79 pages).

"IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 8: Medium Access Control (MAC) Quality of Service Enhancements," IEEE Computer Society, Nov. 11, 2005 (210 pages).

"IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Std 802.11™-2007, Jun. 12, 2007 (1,232 pages).

"Wi-Fi Peer-to-Peer (P2P) Technical Specification," Draft Version 0.11, Wi-Fi Alliance Technical Committee, P2P Task Group, Jul. 16, 2009 (108 pages).

Arnedo-Moreno and Herrera-Joancomarti, "A survey on security in JXTA applications," J Systems and Software, Sep. 2009, 82(9):1513-1525.

Bonjour, Apple Computer Inc., retrieved from http://developer.apple.com/networking/bonjour, Feb. 14, 2009 (2 pages).

Cai et al., "Simple Service Discovery Protocol/1.0," Internet Engineering Task Force, Internet Draft, Feb. 26, 1999 (11 pages).

Extensible Markup Language (XML), retrieved from http://www.w3.org/XML/, Sep. 26, 2009 (4 pages).

Heddie et al. "Peer-to-Peer Discovery: A Key to Enabling Robust, Interoperable C2 Architectures", Mar. 15, 2005, Sparta Inc. pp. 1-12 (http://www.dodccrp.org/events/1Oth_ICCRTS/CD/papers/078.pdf)(accessed Mar. 2, 2012).

"Khambatti et al. "Peer-to-Peer Communities: Formation and Discovery"" May 3, 2003, Arizona State University, pp. 1-8 (http ://cactus. eas. asu .edu/partha/Papers-P D F/2002/pdcs-iasted-02.pdf)( accessed Mar. 2, 2012)( date confirmed:
http ://wayback. archive .o rg/web/2001 0915000000 */http ://cactus. eas. asu. edu/partha/ Pape rs-PDF /2002/pdcs-iasted-02. pdf).

RDF Vocabulary Description Language 1.0: RDF Schema, W3C Recommendation, retrieved from http://www.w3.org. TR/rdf-schema, Feb. 10, 2004, ( 11 pages).

Resource Description Framework, RDF/XMLSyntax Specification (Revised), W3C Recommendation, retrieved from http://www.w3.org/TR/rdf-syntax-grammar, Feb. 10, 2004 (45 pages).

(56) References Cited

OTHER PUBLICATIONS

Rosenberg et al., "SIP: Session Initiation Protocol," Network Working Group, RFC 3261, Jun. 2002 (269 pages).
Universal Plug and Play (UPnP), "UPnP Device Architecture 1.0," UPnP Forum, Apr. 24, 2008 (80 pages).
Vu et al. "Peer-to-Peer Computing, Principles and Applications", Dec. 1, 2009, 1st ed., Springer, pp. 11-80.
"Wilson, Brendan J. "JSTX"". Jun. 15, 2002, New Rider Publishing, 1st ed., pp. 83-124.
Office Action issued in Canadian Application No. 2,776,016 dated Sep. 12, 2016.
Office Action issued in Canadian Application No. 2,776,016 dated Jul. 10, 2017; 4 pages.
Office Action issued in Chinese Application No. 201080044777.8 dated May 24, 2017; 15 pages.
Patent Cooperation Treaty, "International Preliminary Report on Patentability," issued by the International Bureau in connection with PCT application No. PCT/IB2010/054408, dated Apr. 3, 2012 (5 pages).
Patent Cooperation Treaty, "International Search Report," issued by the International Searching Authority in connection with PCT application No. PCT/IB2010/054408, dated Jan. 4, 2011 (3 pages).
Patent Cooperation Treaty, "Written Opinion of the International Searching Authority," issued by the International Searching Authority in connection with PCT/IB2010/054408, dated Jan. 4, 2011 (4 pages).
Patent Cooperation Treaty, "International Preliminary Report on Patentability," issued by the International Bureau in connection with PCT application No. PCT/IB2010/054409, dated Apr. 3, 2012 (8 pages).
Patent Cooperation Treaty, "International Search Report," issued by the International Searching Authority in connection with PCT application No. PCT/IB2010/054409, dated Mar. 3, 2011 (7 pages).
Patent Cooperation Treaty, "Written Opinion of the International Searching Authority," issued by the International Searching Authority in connection with PCT/182010/054409, dated Mar. 3, 2011 (7 pages).
Communication Pursuant to Article 94(3) EPC issued in European Application No. 10773399.0 dated Nov. 20, 2017; 6 pages.
Communication Pursuant to Article 94 (3) EPC issued in European Application No. 10773399.0 dated Oct. 2, 2019, 4 pages.
Office Action issued in Singapore Application No. 10201406255P dated Dec. 18, 2019, 4 pages.

\* cited by examiner

TERMINAL CAPABILITIES DATA STRUCTURE — 306

| PROPERTY TYPE | PROPERTY NAME |
|---|---|
| SERVICE TYPE: "WLAN PEER COMMUNICATIONS" (904) | |
| LINK MECHANISM (906) | ADHOC |
| | Wi-Fi P2P |
| | DLS |
| | BT |
| | BT AMP |
| NETWORK CONFIGURATION (908) | DHCP |
| | NETMASK |
| | DEFAULT GATEWAY |
| | DNS |
| | NAT |
| SERVICES (910) | STREAMING |
| | FILE EXCHANGE |
| | GATEWAY |
| | SHARING |
| | EMERGENCY SERVICE ACCESS |
| | QoS CLASSES |
| | VoIP |
| ALTERNATE NETWORK DISCOVERY PROTOCOLS (912) | UPnP |
| | BONJOUR |
| | SDP |
| | SIP |
| | UDDI |
| AUTHENTICATION (914) | EAP |
| | USERNAME/PASSWORD |
| LOCATION (916) | CIVIC |
| | GEO |
| DEVICE TYPE (918) | PHONE |
| | HANDHELD |
| | COMPUTER |
| | PRINTER |
| | HiFi |

CONTROL POINT (CP) MANAGEMENT
DATA STRUCTURE

| TERMINAL STATION | P2P CAPABILITIES/ CONFIGURATION | P2P CONNECTION | SERVICE |
|---|---|---|---|
| STA1 | {WiFi P2P; etc...} | STA2, [SPEED], ... | VoIP |
| STA2 | {WiFi P2P; etc...} | STA1, [SPEED], ... | VoIP |
| STA3 | {ADHOC; etc...} | NONE | NONE |
| STA4 | {BT; etc...} | STA5, STA6, [SPEED], ... | IM |
| | | STA5, [SPEED], ... | VoIP |
| STA5 | {BT; etc...} | STA4, STA6, [SPEED], ... | IM |
| | | STA4, [SPEED], ... | VoIP |
| STA6 | {BT; etc...} | STA4, STA5, [SPEED], ... | IM |

1002 — TERMINAL STATION
1004 — P2P CAPABILITIES/CONFIGURATION
1006 — P2P CONNECTION
1008 — SERVICE

```xml
<?xml version="1.0" encoding="UTF-8" ?>
<schema xmlns="http://www.w3.org/2001/XMLSchema"
targetNamespace="urn:wifi:xml:ns:wlan:p2pcomms"
xmlns:p2p="urn:wifi:xml:ns:wlan:p2p-comms"
xmlns:xlink="http://www.w3.org/1999/xlink">
<import namespace="http://www.w3.org/1999/xlink" schemaLocation="xlink.xsd" />
<element name="serviceType">
 <complexType>
      <sequence>
            <element ref="p2p:linkMechanism" />
            <element ref="p2p:netConfig" />
            <element ref="p2p:seviceList" />
            <element ref="p2p:AlternateDiscoveryProtocols" />
      </sequence>
 </complexType>
</element>
<element name="linkMechanism">
 <complexType>
  <sequence>
       <element maxOccurs="unbounded" ref="p2p:adHocLink" />
    </sequence>
 </complexType>
</element>
<element name="adHocLink">
 <complexType>
    <attribute name="linkIDPrefix" use="required" type="NCName" />
    <attribute name="linkType" />
 </complexType>
</element>
<element name="netConfig">
 <complexType>
  <sequence>
            <element ref="p2p:dhcp" />
            <element ref="p2p:netmask" />
            <element ref="p2p:defaultGateway" />
            <element ref="p2p:dns" />
            <element ref="p2p:nat" />
     </sequence>
 </complexType>
</element>
<element name="dhcp">
 <complexType>
  <simpleContent>
   <extension base="NMTOKEN">
            <attribute name="enabled" use="required" type="boolean" />
      </extension>
    </simpleContent>
 </complexType>
</element>
<element name="netmask" type="NMTOKEN" />
<element name="defaultGateway" type="NMTOKEN" />
<element name="dns" type="NMTOKEN" />
```

```xml
- <element name="nat">
  - <complexType>
    - <sequence>
              <element ref="p2p:natInside" />
              <element ref="p2p:natOutside" />
      </sequence>
    </complexType>
  </element>
- <element name="natInside">
  - <complexType>
    - <simpleContent>
      - <extension base="NMTOKEN">
              <attribute name="type" use="required" type="NCName" />
        </extension>
      </simpleContent>
    </complexType>
  </element>
- <element name="natOutside">
  - <complexType>
    - <simpleContent>
      - <extension base="NMTOKEN">
              <attribute name="type" use="required" type="NCName" />
        </extension>
      </simpleContent>
    </complexType>
  </element>
- <element name="seviceList">
  - <complexType>
    - <sequence>
              <element maxOccurs="unbounded" ref="p2p:service" />
      </sequence>
    </complexType>
  </element>
- <element name="service">
  - <complexType>
    - <sequence>
              <element ref="p2p:svcDescription" />
              <element minOccurs="0" ref="p2p:svcDiscoveryProtocolTypes" />
      </sequence>
      <attribute name="cos" use="required" type="NMTOKEN" />
      <attribute name="id" use="required" type="NCName" />
      <attribute name="vendor" />
      <attribute name="version" use="required" type="decimal" />
    </complexType>
  </element>
  <element name="svcDescription" type="string" />
- <element name="svcDiscoveryProtocolTypes">
  - <complexType>
    - <sequence>
              <element ref="p2p:sdpType" />
      </sequence>
    </complexType>
  </element>
- <element name="sdpType">
  - <complexType>
        <attribute name="addrType" use="required" type="NCName" />
        <attribute name="id" use="required" type="NCName" />
        <attribute name="multicastAddr" use="required" type="NMTOKEN" />
    </complexType>
  </element>
```

```
- <element name="AlternateDiscoveryProtocols">
  - <complexType>
    - <sequence>
              <element ref="p2p:UPnP" />
              <element ref="p2p:Bonjour" />
      </sequence>
    </complexType>
  </element>
- <element name="UPnP">
  - <complexType>
    - <complexContent>
      - <extension base="p2p:svcMapper">
              <attribute ref="xlink:actuate" use="required" />
              <attribute ref="xlink:href" use="required" />
              <attribute ref="xlink:type" use="required" />
        </extension>
      </complexContent>
    </complexType>
  </element>
- <element name="Bonjour">
  - <complexType>
    - <complexContent>
      - <extension base="p2p:svcMapper">
              <attribute ref="xlink:actuate" use="required" />
              <attribute ref="xlink:href" use="required" />
              <attribute ref="xlink:type" use="required" />
        </extension>
      </complexContent>
    </complexType>
  </element>
- <complexType name="svcMapper">
  - <sequence>
        <element ref="p2p:svcMapper" />
    </sequence>
  </complexType>
- <element name="svcMapper">
  - <complexType>
    - <sequence>
              <element maxOccurs="unbounded" ref="p2p:svcMapEntry" />
      </sequence>
    </complexType>
  </element>
- <element name="svcMapEntry">
  - <complexType>
          <attribute name="contains" />
          <attribute name="refId" use="required" type="NCName" />
    </complexType>
  </element>
</schema>
```

FIG. 17C

```xml
<?xml version="1.0" ?>
<p2p:serviceType xmlns:p2p="urn:wifi:xml:ns:wlan:p2p-comms"
    xmlns:xsi="http://www.w3.org/2001/XMLSchema-instance"
    xmlns:xlink="http://www.w3.org/1999/xlink"
    xsi:schemaLocation="http://www.w3.org/1999/xlink xlink.xsd
urn:wifi:xml:ns:wlan:p2p-comms p2pcomms.xsd">
<!-- Ad-hoc control point definition for a P2P Network -->
- <p2p:linkMechanism>
    <p2p:adHocLink linkIDPrefix="AH_Link1" />
    <p2p:adHocLink linkIDPrefix="AH_Link2" linkType="WiFi P2P" />
  </p2p:linkMechanism>
- <p2p:netConfig>
    <p2p:dhcp enabled="true">192.168.2.1</p2p:dhcp>
    <p2p:netmask>255.255.255.0</p2p:netmask>
    <p2p:defaultGateway>192.168.22.1</p2p:defaultGateway>
    <p2p:dns>192.168.22.2</p2p:dns>
  - <p2p:nat>
      <p2p:natInside type="IPv4">192.168.2.1</p2p:natInside>
      <p2p:natOutside type="IPv4">63.63.63.1</p2p:natOutside>
    </p2p:nat>
  </p2p:netConfig>
- <p2p:seviceList>
    <!-- Pre-provisioned service list accessible to the control point -->
    <!-- with discovery protocol types/hints -->
  - <p2p:service id="VOIP_A1" version="1.0" vendor="Skype" cos="WiFi:Voice">
      <p2p:svcDescription>WiFi Voice Using Skype</p2p:svcDescription>
    - <p2p:svcDiscoveryProtocolTypes>
        <p2p:sdpType id="SSDP" addrType="IPv4" multicastAddr="239.255.255.250" />
      </p2p:svcDiscoveryProtocolTypes>
    </p2p:service>
  - <p2p:service id="ESAP" version="1.0" cos="WiFi:Required">
      <p2p:svcDescription>WiFi Emergency Service Access "</p2p:svcDescription>
    </p2p:service>
  - <p2p:service id="CLK_A1" version="1.0" vendor="T-Wifi(tm)" cos="WiFi:Time">
      <p2p:svcDescription>WiFi Clock Service"</p2p:svcDescription>
    - <p2p:svcDiscoveryProtocolTypes>
```

FIG. 18A

```
<p2p:sdpType id="SSDP" addrType="IPv4" multicastAddr="239.255.255.250" />
    </p2p:svcDiscoveryProtocolTypes>
  </p2p:service>
  </p2p:sevicetList>
- <p2p:AlternateDiscoveryProtocols>
  <!-- Alternative discovery protocols - to be used where/when a service list entry does -->
  <!-- or a given service list entry is unable to be discovered using a specified sdp type -->
- <p2p:UPnP xlink:type="resource" xlink:href="http://www.example.com/wifi/UPnP/Voice" xlink:actuate="onRequest"/>
  - <p2p:svcMapper>
      <p2p:svcMapEntry refId="VOIP_A1" />
      <p2p:svcMapEntry refId="Ref1" contains="^[a-zA-Z0-9]*Print[a-zA-Z0-9]*" />
    </p2p:svcMapper>
  </p2p:UPnP>
- <p2p:Bonjour xlink:type="resource" xlink:href="http://www.example.com/wifi/Bonjour/Clock"
    xlink:actuate="onRequest">
  - <p2p:svcMapper>
      <p2p:svcMapEntry refId="CLK_A1" />
      <p2p:svcMapEntry refId="Ref2" contains="^[a-zA-Z]*Time" />
    </p2p:svcMapper>
  </p2p:Bonjour>
  </p2p:AlternateDiscoveryProtocols>
</p2p:serviceType>
```

WIRELESS TERMINAL

METHOD AND APPARATUS FOR PEER-TO-PEER COMMUNICATIONS IN A WIRELESS LOCAL AREA NETWORK INCLUDING THE NEGOTIATION AND ESTABLISHMENT OF A PEER-TO-PEER CONNECTION BETWEEN PEERS BASED ON CAPABILITY INFORMATION

RELATED APPLICATIONS

The patent is a continuation of and claims the benefit of U.S. application Ser. No. 12/868,550, file Aug. 25, 2010, which claims the benefit of U.S. Provisional Application No. 61/248,328 filed Oct. 2, 2009, which are hereby incorporated by reference in their entirety.

FIELD OF THE DISCLOSURE

The present disclosure relates generally to network communications and, more particularly, to methods and apparatus to establish peer-to-peer communications.

BACKGROUND

Wireless network deployments, such as wireless local area networks (WLANs), allow wireless terminals to access other devices and services when those terminals are within proximity of wireless communication signals of those wireless networks. Another method of accessing such devices and/or services involves the use of peer-to-peer (P2P) connections, in which a wireless terminal can communicate directly with another wireless terminal, device or service. However, known methods of establishing P2P connections require a significant amount of user involvement to provide proper configuration information and to discover other devices capable of P2P communications. This can often prove frustrating and can discourage many users from attempting to establish such P2P connections.

BRIEF DESCRIPTION OF THE DRAWINGS

FIG. 12 depicts an example terminal capabilities data structure.

FIG. 13 depicts an example control point management data structure.

FIGS. 17A-17C depict an example schema for use in arranging P2P capabilities and configuration information communicated between wireless terminals.

FIGS. 18A and 18B depict an example P2P capabilities message that indicates one or more P2P services available in a network.

DETAILED DESCRIPTION

Figure 1:
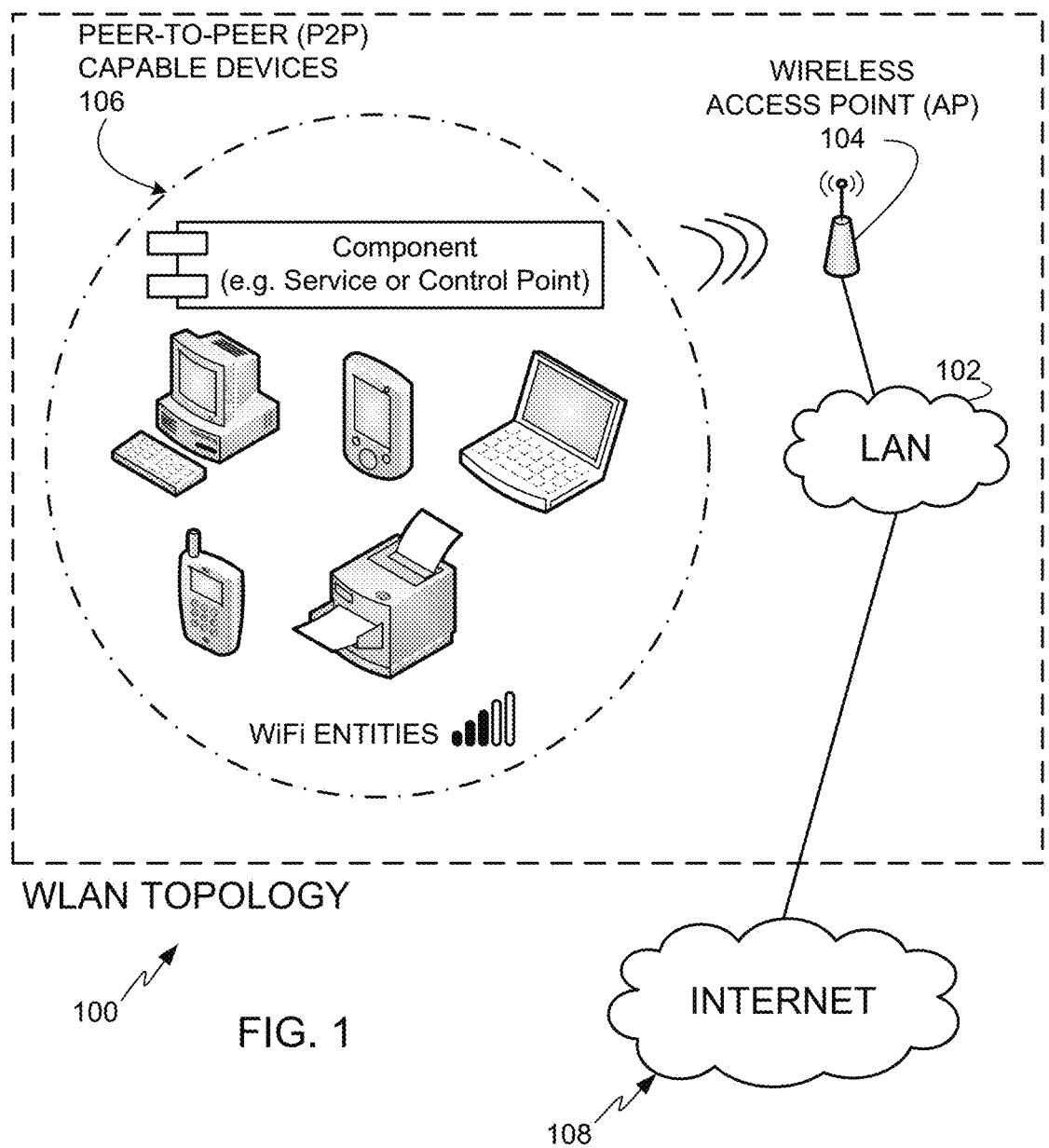
FIG. 1 depicts an example wireless local area network (WLAN) topology.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used by wireless terminals to discover peer-to-peer (P2P) capabilities of other wireless terminals in wireless network environments and establish P2P connections with one or more of those wireless terminals. At least some advantages of P2P connections are that they can be made secure between two entities and involve unicast communications instead of multicast communications that are typically used by access points to communicate information to all wireless terminals or devices connected thereto. Unicast communications require relatively less bandwidth use by an access point (AP) than multicast communications. Thus, using unicast P2P communications between two peers can be especially advantageous when the peers are transferring relatively large amounts of information (e.g., large files, streaming media, VoIP video or voice calls, etc.).

The example methods and apparatus described herein can be used in connection with mobile communication devices, mobile computing devices, or any other element, entity, device, or service capable of communicating wirelessly with a wireless network. Devices, also referred to as terminals, wireless terminals, stations (non-AP stations), or user equipment (UE), may include mobile smart phones (e.g., a BlackBerry® smart phone), wireless personal digital assistants (PDA), laptop/notebook/netbook computers with wireless adapters, etc. The example methods and apparatus are described herein in connection with the wireless local area network (WLAN) communication standard known as IEEE® (Institute for Electrical and Electronics Engineers) 802.11. However, the example methods and apparatus may additionally or alternatively be implemented in connection with other wireless communication standards including other WLAN standards, personal area network (PAN) standards, wide area network (WAN) standards, or cellular communication standards.

The example methods and apparatus described herein can be implemented in any environment providing wireless access for network connectivity (e.g., WLANs). For instance, the example methods and apparatus can be implemented in private WLAN access locations or environments or in public WLAN access locations or environments in which it is expected that one or more users carrying respective wireless terminals will frequently connect and disconnect from a WLAN as they enter and exit the WLAN access locations or environments.

Some known techniques or standards for establishing P2P connections between wireless terminals require that a P2P connection go through an intermediary WLAN infrastructure the entire time during which the P2P connection is active. Other P2P connection types allow for wireless terminals to connect directly to one another without an intermediary WLAN infrastructure. However, in both instances, users must manually configure their wireless terminals to establish such P2P connections. Such configurations can often be complicated and user-error prone. For instance, it is often necessary that a user be aware of another wireless terminal or perform some prior investigation regarding whether another wireless terminal to which the user seeks to connect has the same P2P communication capabilities as the user's wireless terminal. Such investigation requires that the user understands or knows the configuration information for which to search and may require navigating through a series of user-interface menus and screens on both wireless terminals or referring to user manuals of the wireless terminals. In some instances, user manuals may be of no help in this regard. In addition, some wireless terminals may not provide sufficient user interface functionality to investigate their P2P capabilities and/or P2P configuration parameters. For example, while one wireless terminal may be a BlackBerry® smart phone, another wireless terminal may be a third-party printer of which P2P capabilities and/or configuration information may not be readily attainable. Such a process can often prove frustrating, especially for a novice user, for whom P2P communications may be extremely useful but may rarely, if ever, be able to benefit from such communications due to the complicated configuration process.

Known standards that enable P2P communications include WLAN infrastructure, WLAN ad-hoc, Wi-Fi P2P, Wi-Fi Tunneled Direct Link Setup (TDLS), and Wi-Fi single-hop mesh. WLAN ad-hoc is rarely used due to wireless terminal interoperability issues and useability issues. Wi-Fi P2P is specified by the Wi-Fi Alliance (WFA) and allows one of the peer devices to provide P2P connectivity by acting or functioning as an AP. Wi-Fi TDLS is a mechanism of peer communications defined by the IEEE 802.11z standard. Wi-Fi TDLS allows peer devices to communicate over P2P connections traversing a WLAN infrastructure which is configured to transfer data frames or packets between two peer terminals via a tunneled link. Wi-Fi single-hop mesh is a mechanism defined in IEEE 802.11s that also provides P2P connectivity via a WLAN infrastructure.

Many wireless terminals can be capable of establishing P2P connections using one or more internet protocol (IP) protocols. As such, a user is often burdened with configuring both the wireless local area network (WLAN) link level (layer 2 of the OSI model) and IP level (layer 3 of the OSI model) information. In addition, when configuration, capability, or state changes occur to the WLAN infrastructure or to a wireless terminal, the user must re-configure link level and IP level information to re-establish or update a P2P connection. A wireless terminal state change may occur when a user of the wireless terminal is detected as being in a meeting and the wireless terminal has been pre-configured to disable certain functionality (e.g., ignore voice calls or data transfer requests) when its user is in a meeting. Such a change in functionality can cause a profile change (e.g., move to silent mode; do not accept voice calls under any circumstances; etc.).

In addition, many wireless terminals are mobile and are frequently moved between different wireless infrastructure environments. Wireless infrastructure environments often have different infrastructure capabilities and allow a wireless terminal to detect many different wireless terminals with different P2P capabilities when moved between the different wireless infrastructure environments. When the wireless terminal is moved from one wireless infrastructure environment to another, its user must re-configure it for P2P connectivity in the new environment. In addition, the user must re-configure the wireless terminal for P2P connectivity with any other wireless terminal in the wireless infrastructure environment.

The methods and apparatus described herein enable wireless terminals to perform automatic discovery and negotiation/association of P2P networks and/or P2P services through a P2P discovery exchange over one or more P2P-supported protocols within a WLAN environment. The P2P discovery exchange enables wireless terminals to discovery wireless terminals capable of different P2P network connections (e.g., WiFi direct or other types of P2P network connections) and/or to access different P2P services (e.g., voice over internet protocol (VoIP), media streaming, etc.) over such P2P network connections. In this manner, wireless terminals can determine whether to establish P2P connections with other wireless terminals based on the discovered P2P network types and the discovered P2P services. For example, the example methods and apparatus described herein enable wireless terminals to request or propose P2P connections based on particular P2P network types and particular P2P services. Such a proposed combination of P2P network type and service may involve a wireless terminal requesting to connect with another wireless terminal via a WiFi direct network connection type to use a VoIP service.

Example physical, logical, or functional entities capable of P2P communications include printers, gateways, personal information management (PIM) synchronization services (e.g., calendar synchronization, media source synchronization, etc.), media playback (e.g., play specific media file—a digitally encoded music track), printing (e.g., wireless printing service), and download services (e.g., P2P download, file sharing, and/or network storage). In addition, the P2P discovery enables wireless terminals to access service registry/information interfaces (e.g., endpoints offering resources, applications, and/or service logic including wirelessly accessible agents/nomadic agents, proxies, etc.) and domain information (i.e., network information that a domain is authorized to share with wireless terminals performing P2P discovery) (e.g., access points topology, naming, locations within the domain, etc.). Thus, although illustrated examples are described herein in connection with two or more wireless terminals discovering and connecting to one another, the methods and apparatus described herein may alternatively be implemented in substantially identical or similar manners using other P2P-capable elements (or P2P-capable entities) including any other type of P2P-capable terminals or services including the above-noted elements.

In operation, when a P2P-capable wireless terminal has established a connection with a WLAN, the wireless terminal transmits a P2P capabilities message using an existing WLAN infrastructure, indicating its P2P connection capabilities. In response, another P2P-capable wireless terminal that is also connected to the WLAN responds to the P2P capabilities message to begin a P2P capabilities exchange and P2P connection negotiation should the wireless terminals have compatible P2P capabilities. During a discovery process, wireless terminals exchanging discovery, capability, and negotiation messages are referred to as discovering wireless terminals or discovery devices.

As described in connection with the examples herein, each discovering wireless terminal is able to exchange information without user intervention to exchange P2P capabilities information with other discovering wireless terminals and/or P2P services and seek to establish P2P connections. In some example implementations described herein, a P2P discovery exchange can occur between two wireless terminals connected via a wireless LAN. In other example implementations, while two wireless terminals are connected and communicate via a wireless LAN, the P2P discovery exchange can be facilitated by a control point (CP), which is an additional logical component accessible by the discovering wireless terminals. In the illustrated example implementations described herein, a control point can assist in tracking P2P capabilities of different wireless terminals and facilitate communicating such P2P capabilities to any discovering wireless terminal that connects to a WLAN associated with the control point. As explained below in connection with FIGS. 6-10, a control point can reside in different places relative to a WLAN environment (e.g., in a wireless access point, in a network communicatively coupled to the wireless access point, and/or in a wireless terminal) or can be a virtual entity made up of separate control points working in cooperation with one another.

Turning to FIG. 1, an example WLAN topology 100 is shown as having a LAN 102 connected to a wireless AP 104. Also shown are P2P-capable devices or wireless terminals 106 capable of connecting to and communicating via the AP 104. The example methods and apparatus described herein can be implemented in connection with desktop computers, laptop computers, smart phones, personal computing devices, services (e.g., printers, media streaming servers, etc.), and any other device or service capable of communicating via wireless means. In the illustrated example, the LAN 102 is communicatively coupled to the Internet 108.

Although the Internet 108 is shown in FIG. 1, the example methods and apparatus described herein can be implemented without access to the Internet. In addition, the example methods and apparatus may be implemented without any sophisticated LAN implementation. That is, the wireless terminals 106 need only be able to establish initial communications with one another via an AP (e.g., the AP 104) to perform P2P discovery and P2P capabilities exchanges without needing to access any higher level networks (e.g., LANs, intranets, the Internet). For instance, in some example implementations, the AP 104 may be implemented using a wireless router through which each of the wireless terminals 106 can communicate, and after two or more of the wireless terminals 106 elect to communicate directly via P2P connections, such communications can occur between the wireless terminals 106 without needing to communicate via the intermediary AP 104 (e.g., one of the wireless terminals can function as an AP, or a P2P mode that does not require an AP can be used). The example methods and apparatus described herein can also be used to establish P2P connections that traverse an AP.

In the illustrated examples described herein, each wireless terminal 106 capable of P2P communications locally pre-stores its P2P capability information. The P2P capability information may be provided by a manufacturer of the wireless terminal 106, by software or drivers installed on the wireless terminal 106, by a service provider vendor of the wireless terminal, by a network service provider, a wireless communications service provider, a user of the wireless terminal 106, etc. The P2P capabilities may be stored in a fixed memory of a wireless terminal 106 or in a removable memory or removable module (e.g., an authentication card, a security card, a subscriber identity module (SIM), etc.). In some example implementations, communication service providers such as wireless communication carriers or network operators can restrict the types of P2P protocols or modes that can be used by wireless terminals 106 offered by them or connected to their networks.

Figure 2:
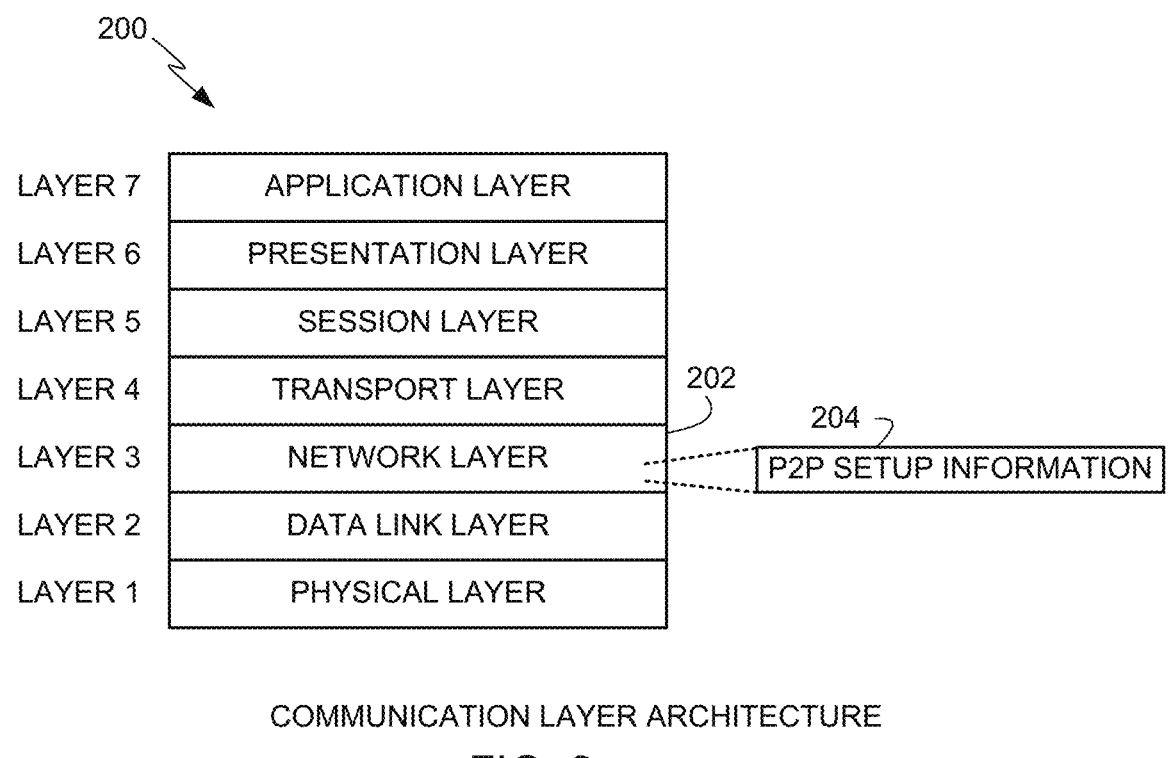
FIG. 2 depicts communication layer architecture in accordance with the Open Systems Interconnection Standard (OSI) model.

FIG. 2 depicts an example communication layer architecture 200 that may be used to implement P2P discovery and capabilities exchanges and establish P2P connections between wireless terminals. The example communication layer architecture 200 is shown as having seven layers which may be implemented in accordance with, for example, the well-known OSI Reference Model. In the illustrated example, the communication layer architecture 200 includes a network layer 202 (i.e., an internet protocol (IP) layer). In the illustrated examples described herein, wireless terminals (e.g., the wireless terminals 106 of FIG. 1) are configured to exchange P2P setup information 204 (e.g., information used in P2P discovery and capabilities exchanges and P2P connection negotiation and initiation messages) via wireless APs (e.g., the AP 104 of FIG. 1) using communications at the network layer 202. That is, the wireless terminals 106 can exchange the P2P setup information 204 via the AP 104 at the network layer 202 without needing to use operations above the network layer 202 (i.e., without needing to communicate the P2P setup information 204 at a transport layer, a session layer, a presentation layer, or an application layer of the communication layer architecture 200).

Figure 3:
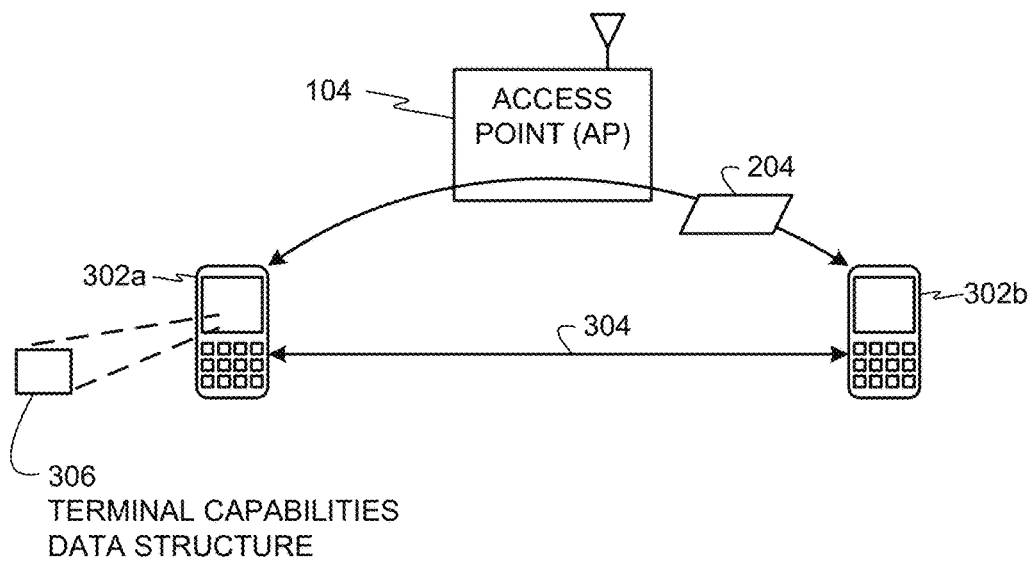
FIG. 3 depicts example wireless terminals discovering peer-to-peer (P2P) capabilities via a wireless access point and establishing a P2P connection.

Turning now to FIG. 3, example wireless terminals 302a and 302b communicate P2P setup messages (e.g., including the P2P setup information 204 of FIG. 2) via the AP 104 to discover each other's P2P capabilities and establish a P2P connection 304 with one another. Although the P2P connection 304 is shown as bypassing the AP 104, other types of P2P connections can be established that involve peers communicating via the AP 104 during the P2P connections. Similarly, while P2P connections depicted in the example implementations of FIGS. 4-11 are also shown as bypassing APs, the example implementations of FIGS. 4-11 may also use other types of P2P connections involving peers communicating via one or more APs during the P2P connections.

In the illustrated example, the wireless terminal 302a is shown as storing a terminal capabilities data structure 306, which stores the parameter information indicative of the P2P capabilities (e.g., connection types, protocols, supported authentication or security methods, etc.) of the wireless terminal 302a. The terminal capabilities data structure 306 and example parameters that can be stored therein are described in detail below in connection with FIG. 12. Although not shown, the wireless terminal 302b also stores a terminal capabilities data structure similar to the terminal capabilities data structure 306 to store parameters indicative of its P2P capabilities. The wireless terminals 302a-b exchange at least some of the information in their respective terminal capabilities data structures (e.g., the terminal capabilities data structure 306) with one another using the P2P setup information 204 to discover each other's P2P capabilities and establish a P2P connection with one another.

In the illustrated example of FIG. 3, the wireless terminals 302a-b are shown as communicating the P2P setup information 204 via the single AP 104. The example configuration of FIG. 3 enables the wireless terminals 302a-b to establish the P2P connection 304 therebetween without needing the AP 104 to be connected to any other LAN or network. That is, in the illustrated example, the wireless terminals 302a-b can discover each other's P2P capabilities, negotiate the P2P connection 304, and establish the P2P connection 304 while relying only on their stored information and their abilities to communicate via the AP 104.

Figure 4:
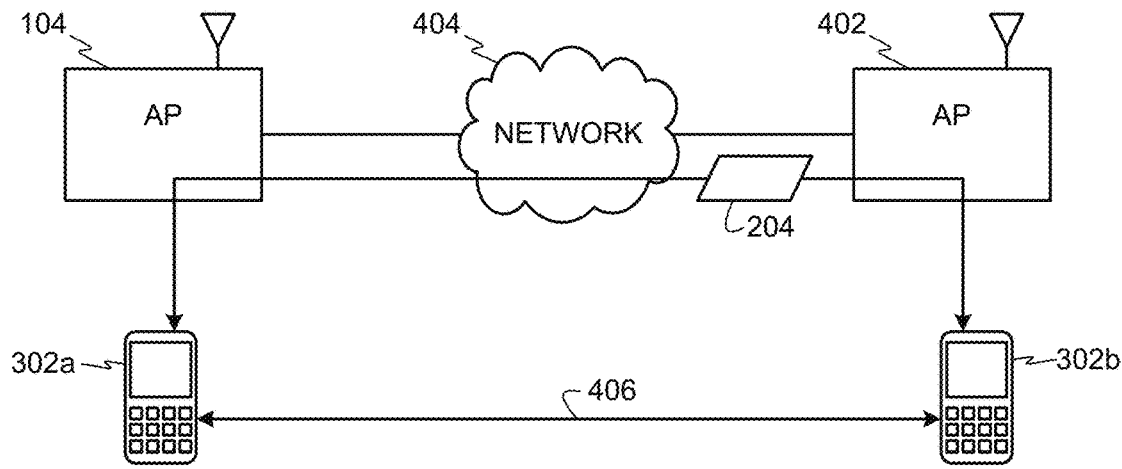
FIG. 4 depicts example wireless terminals discovering P2P capabilities via wireless access points communicatively coupled via a network and establishing a P2P connection.

In another example implementation depicted in FIG. 4, the AP 104 is in communication with another AP 402 via a network 404, and the wireless terminals 302a-b are shown as discovering one another and exchanging the P2P setup information 204 via the AP 104, the network 404, and the AP 402. The network 404 may be a LAN, a wide area network (WAN), an intranet, the Internet, or any other public or private network. Although only one network (the network 404) is shown in FIG. 4, the example methods and apparatus described herein may be implemented using wireless terminals (e.g., the wireless terminals 302a-b) that initially discover one another via APs that are in communication with each other through two or more networks. Similar to the example implementation of FIG. 3, the wireless terminals 302a-b can discover each other's P2P capabilities, negotiate a P2P connection 406, and establish the P2P connection 406 while relying only on their stored information and their abilities to communicate via the AP 104, the network 404, and the AP 402.

Figure 5:
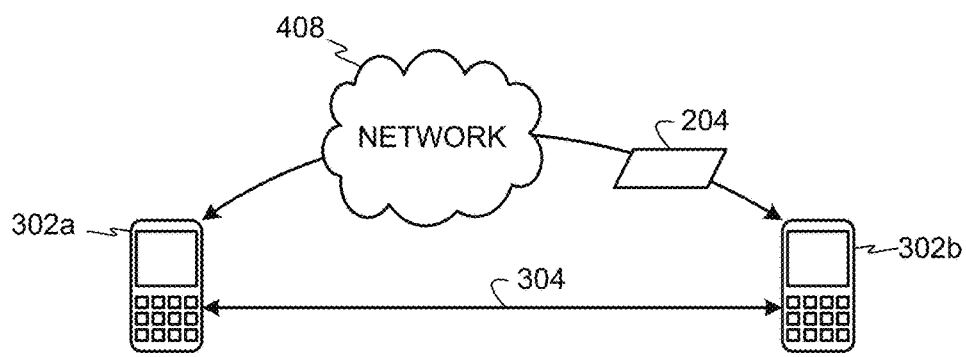
FIG. 5 depicts example wireless terminals discovering P2P capabilities via a wireless network and establishing a P2P connection without the use of an access point.

In other example implementations, such as illustrated in FIG. 5, the wireless terminals 302a-b may connect to one another via a wireless network 408 without using an AP. In the illustrated example of FIG. 5, the network 408 may be a mesh network, and the wireless terminals 302a-b can discover each other's P2P capabilities via the mesh network 408 and establish a P2P connection without using an AP.

While FIGS. 3-5 depict example implementations in which the wireless terminals 302a-b need only rely on their stored P2P capabilities information and their ability to communicate with one another via a wireless network and/or one or more APs, the example methods and apparatus described herein can also be used to provide an intermediary P2P information management service that facilitates or assists in discovering wireless terminals and P2P capabilities of those wireless terminals. Such an intermediary P2P information management service is depicted as a control point 502 in the example implementations of FIGS. 6-10.

In the illustrated examples, the control point 502 is a logical network component that proxies P2P capabilities and services to wireless terminals. The control point 502 can be co-located with a domain name system (DNS) service or a dynamic host configuration protocol (DHCP) service. The control point 502 may also include or proxy other information relating to its connected network (e.g., network default gateway and netmask IP's). The control point 502 is able to mediate state and/or environment changes to one or more associated P2P-capable wireless terminals. For example, if a particular wireless terminal experiences a state change (e.g. as a result of a wireless terminal user entering a meeting), such a state change may affect the corresponding composition of P2P service types and/or P2P capabilities associated with that wireless terminal. To facilitate maintaining any current P2P connections or establishing any future P2P connections with the changed wireless terminal, the control point 502 is able to receive a notification of the detected state change from the wireless terminal. In response, the control point 502 can reflect the appropriate changes within its information store (e.g., a control point management data structure 504 of FIG. 6). In addition, the control point 502 can host or proxy a P2P capabilities exchange update to other wireless terminals on behalf of the changed wireless terminal to reflect its state change. In the illustrated examples described herein, the control point 502 can automatically perform these operations without direct user intervention.

Figure 6:
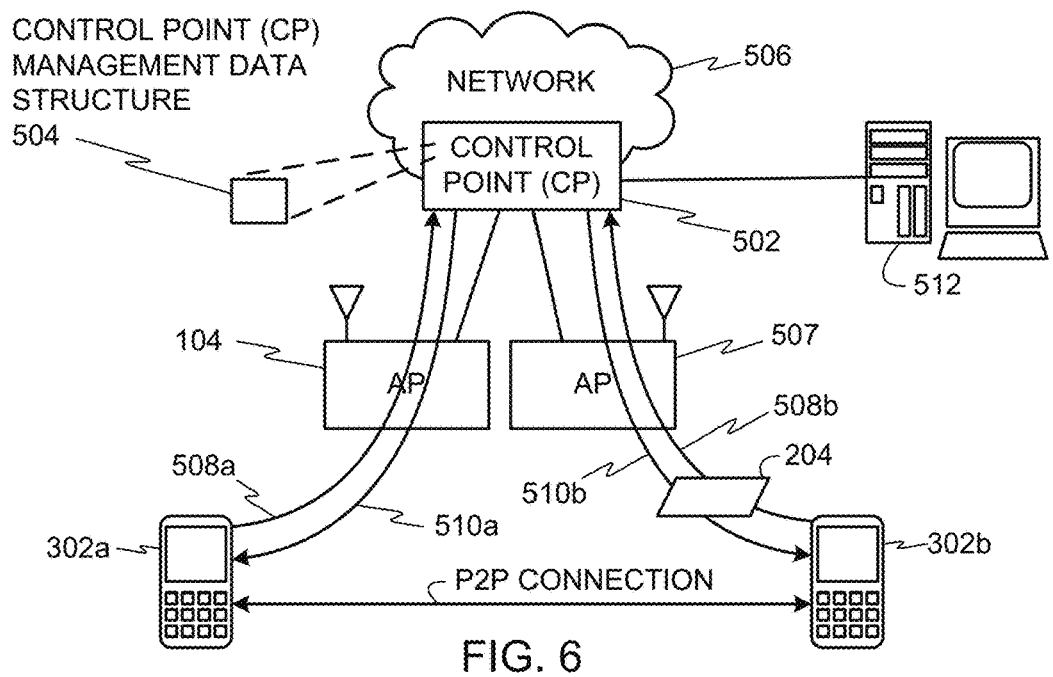
FIG. 6 depicts a control point in a network to facilitate discovering P2P capabilities of wireless terminals and establishing P2P connections between wireless terminals.

As shown in FIG. 6, the control point 502 stores a control point (CP) management data structure 504, which stores parameter information indicative of P2P capabilities (e.g., connection types, protocols, supported authentication or security methods, etc.) of the wireless terminal 302a-b and/or any other wireless terminals from which the control point 502 has received P2P discovery messages and P2P capabilities information (e.g., the P2P setup information 204 of FIG. 2). In addition, the CP management data structure 504 can store P2P connection status information indicative of which wireless terminals are connected to one another via a P2P session. For example, the CP management data structure 504 may store a P2P connection entry for each P2P service type (e.g., VoIP service, instant messaging (IM) service, P2P chat service, media streaming service, printing service, etc.) for which a P2P connection is established between wireless terminals. The CP management data structure 504 and example parameters that can be stored therein are described in detail below in connection with FIG. 13.

In the illustrated example of FIG. 6, the wireless terminals 302a-b are in communication with a network 506 (which may be substantially similar or identical to the network 404 of FIG. 4) via the AP 104 and an AP 507. As shown in FIG. 6, the control point 502 can be implemented as a separate entity within the network 506 (e.g., the control point 502 may be located within a LAN, WLAN, or other network at some arbitrary point addressable by the wireless terminals 302a-b, and by the APs 104 and 507). As shown in FIG. 6, the wireless terminals 302a-b exchange the P2P setup information 204 with the control point 502 via the APs 104 and 507 and the network 506, and the control point 502 facilitates the dissemination or advertisement of wireless terminals' P2P capabilities to other wireless terminals. In the illustrated examples of FIGS. 6 and 7, the P2P capabilities information communicated by the wireless terminals 302a-b are denoted using reference numerals 508a and 508b, and the P2P capabilities advertisements from the control point 502 are denoted using reference numerals 510a and 510b.

Figure 7:
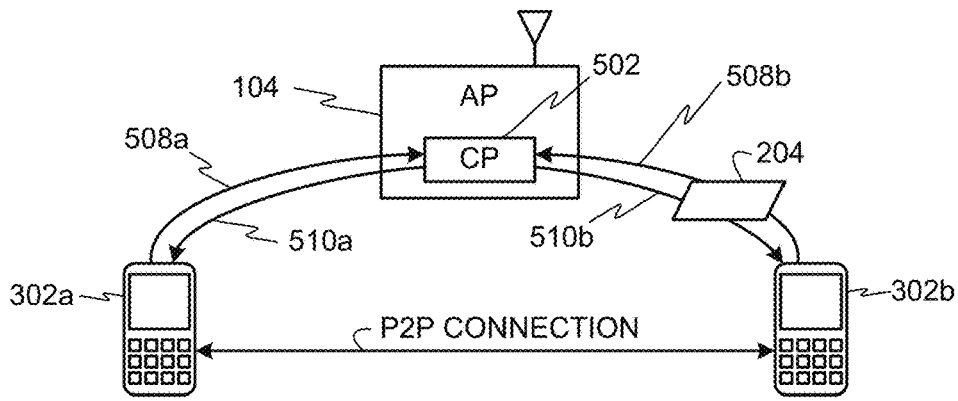
FIG. 7 depicts a control point in a wireless access point to facilitate discovering P2P capabilities of wireless terminals and establishing P2P connections between wireless terminals.

In other example implementations such as depicted in FIG. 7, the control point 502 can alternatively be implemented in the AP 104. As shown in FIG. 7, the wireless terminals 302a-b exchange the P2P setup information 204 with the control point 502 via the AP 104. In yet other example implementations, the control point 502 can alternatively be implemented in a wireless terminal. For example, FIG. 8 shows the control point 502 implemented in the wireless terminal 302b, and the wireless terminal 302a exchanges the P2P setup information 204 with the control point 502 via the AP 104 and the wireless terminal 302b.

Figure 8:
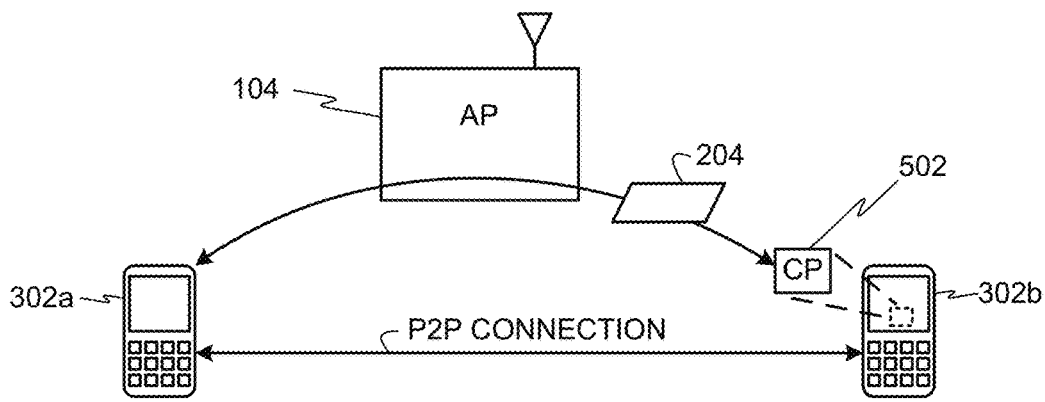
FIG. 8 depicts a control point in a wireless terminal to facilitate discovering P2P capabilities of other wireless terminals and establishing P2P connections between wireless terminals.
Figure 9:
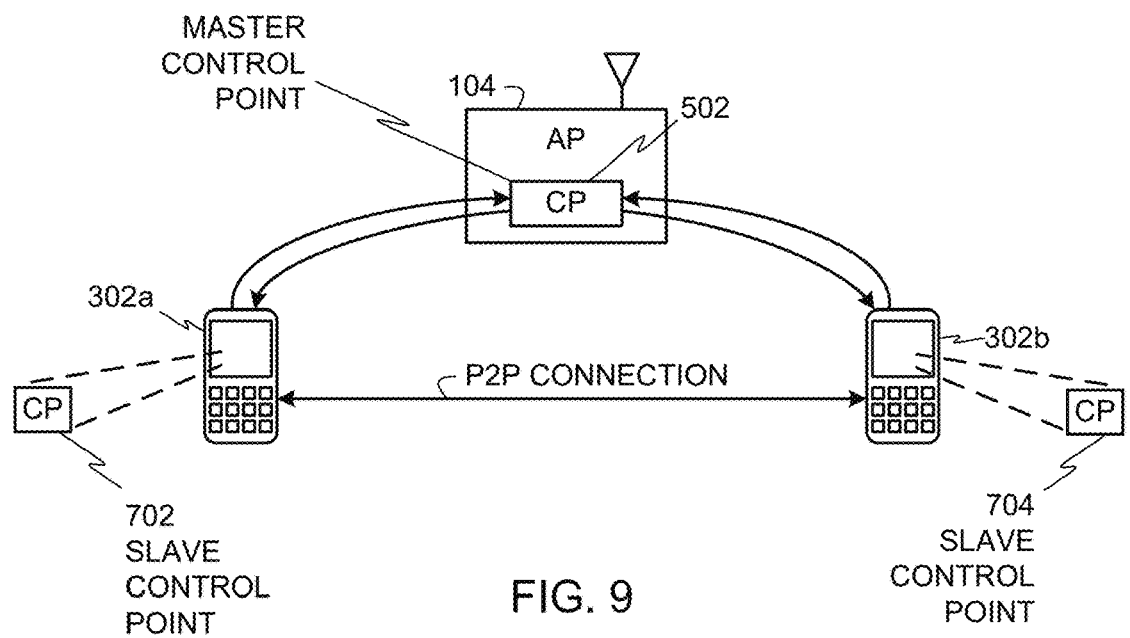
FIG. 9 depicts a plurality of control points present in a network environment.

While each of FIGS. 6-8 shows a single instantiation of the control point 502, in some example implementations, two or more control points may be located in a network environment. For example, one or more wireless terminals may run respective control point services while an AP may also run a control point service. In such implementations, an arbitration scheme may be used to indicate which control point is to be used as a master or primary control point as shown in FIG. 9 or arbitration and negotiations between the control points may be used to form a single logical or virtual control point made up of all or at least some of the separately located control points as shown in FIG. 10.

To enable only one of several control points to function as the master or primary control point for a network environment, an arbitration scheme may be based on a hierarchical selection policy in which a control point in an AP (FIG. 7) should be selected over a control point in a wireless terminal (such as in FIG. 8), and a control point located in a network (such as in FIG. 6) should be selected over a control point in an AP (such as in FIG. 7). For example, in FIG. 9, the control point 502 in the AP 104 is selected as the master or primary control point, and control points 702 and 704 in the wireless terminals 302a-b are designated as slave or auxiliary control points. In the example implementation of FIG. 9, the slave control points 702 and 704 may be used to store P2P capabilities and configuration information for other P2P-capable elements in the network environment and communicate such capabilities and configuration information (or indirect reference indicators (e.g., uniform resource indicators (URIs) describing the network locations storing the capabilities and configuration information)) to the master control point 502. The master control point 502 can then broadcast or advertise such information to other P2P-capable elements and facilitate establishing P2P connections between such P2P-capable elements. Alternatively, in other example implementations, the control points 702 and 704 of the wireless terminals 302a-b can be disabled and the control point 502 can function as the single control point (e.g., a single master control point) for the network environment.

Figure 10:
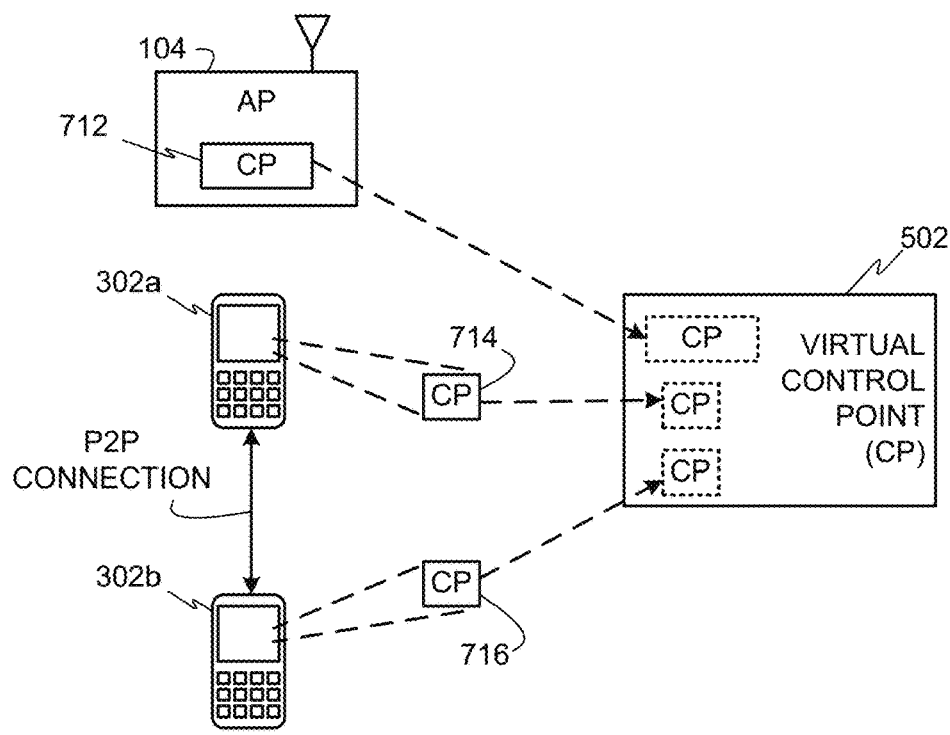
FIG. 10 depicts a virtual control point made up of separately located control points in a network environment.

To form a single logical control point made up of several control points located in different P2P-capable elements as shown in FIG. 10, control points of the P2P-capable elements can work cooperatively as a single virtual control point using arbitration and negotiations. In the illustrated example of FIG. 10, the control point 502 is a virtual control point made up of a control point 712 operating in the AP 104, a control point 714 operating in the wireless terminal 302a, and a control point 716 operating in the wireless terminal 302b.

In the illustrated examples described herein, the control point 502 is configurable to enable modifying its operation. For example, as shown in FIG. 6, a networked computer 512 can be used to access a configuration interface (not shown) of the control point 502. In this manner, an administrator can specify the types of P2P connections that can be negotiated via the control point 502 and/or can specify which types of wireless terminals can connect to one another. For example, wireless service providers may elect to specify that only wireless terminals provided by its service can connect to one another in WLANs that it operates or that are operated by its affiliates. In addition, quality of service (QoS) aspects of the control point 502 can be configured. For instance, if a wireless terminal cannot guarantee that it can provide a minimum level of QoS, then the control point 502 can prevent that wireless terminal from establishing P2P connections with other wireless terminals.

Although FIGS. 3-10 depict P2P connections between only two wireless terminals 302a-b, the example methods and apparatus described herein can be used to discover P2P capabilities and establish P2P connections between two or more wireless terminals. For instance, turning to FIG. 11, after the wireless terminals 302a-b have established a first P2P connection 802, the wireless terminal 302a can discover another P2P-capable wireless terminal 804 and establish a second P2P connection 806 with the wireless terminal 804. In the illustrated example of FIG. 11, the wireless terminal 302a can communicate with the wireless terminals 302b and 804 and is the P2P group owner or hub through which the wireless terminals 302b and 804 can communicate with one another.

Figure 11:
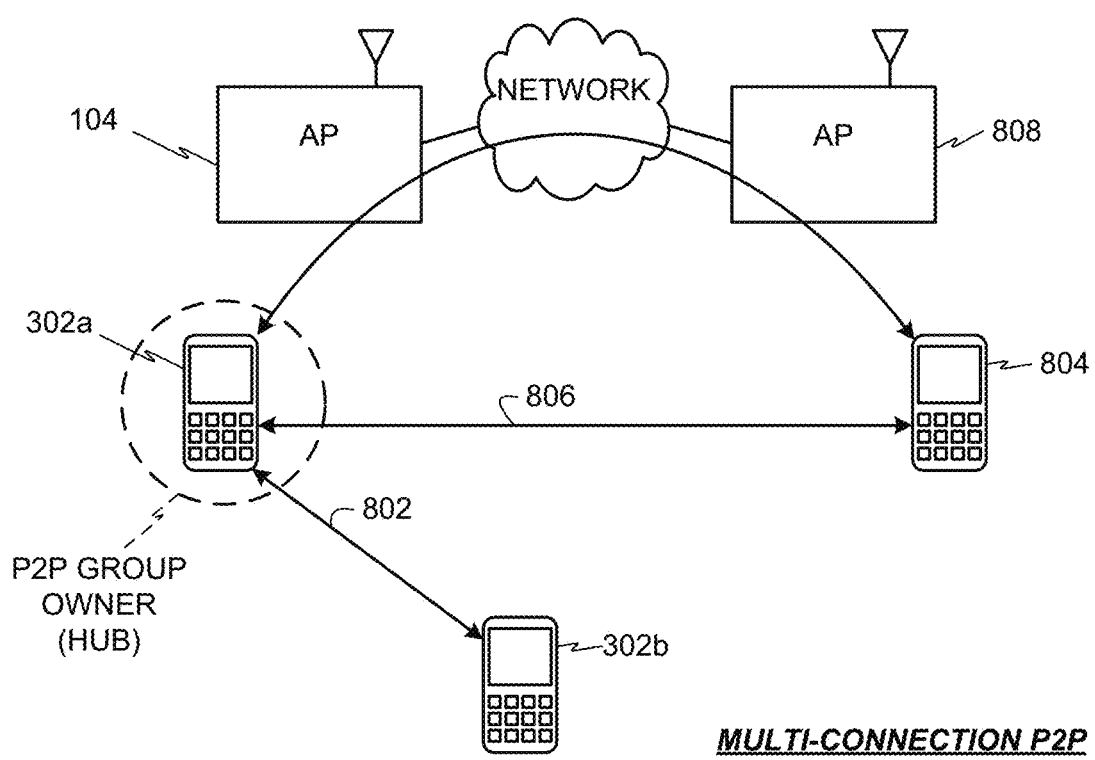
FIG. 11 depicts wireless terminals forming a multi-connection P2P session.

In some example implementations, the multi-connection P2P session of FIG. 11 can be established using one or more control points implemented in any configuration including such configurations as described above in connection with FIGS. 6-10. In some example implementations, the network topology depicted in FIG. 11 may be an inter-domain topology in which the AP 104 is associated with a home network and an AP 808 is associated with a visited network. In such inter-domain implementations, P2P discovery and negotiation messages can be communicated between the wireless terminals 302a-b and 804 via the APs 104 and 808 and their respective domains. In addition, for instances in which each of the APs 104 and 808 includes a respective control point (similar or substantially identical to the control point 502), the control points can work cooperatively across the separate domains to facilitate P2P discovery and connection negotiations between the wireless terminals 302a-b and 804.

FIG. 12 depicts the example terminal capabilities data structure 306 of FIG. 3 in detail. In the illustrated example, the terminal capabilities data structure 306 stores parameters indicative of the P2P capabilities and configurations of the wireless terminal 302a. This information may be provisioned onto wireless terminals through APs or using, for example, an Open Mobile Alliance (OMA) Device Management (DM) interface or through some non-standard provisioning platform. The manner of communicating the P2P capabilities and configuration information to wireless terminals can depend on the topology and structure of the associated network domain encapsulating the P2P-capable devices.

In addition, in the illustrated example of FIG. 12, the P2P capabilities parameters correspond to a service type called "WLAN Peer Communications." During a P2P discovery process, the wireless terminal 302a broadcasts a discovery request including the service type name "WLAN Peer Communications" to query whether there are any other wireless terminals within wireless communication reach of the wireless terminal 302a with which to establish a P2P connection. The wireless terminal 302a can then communicate other parameter information stored in the terminal capabilities data structure 306 to the discovered wireless terminals (e.g., the devices 106 of FIG. 1, the wireless terminal 302b of FIGS. 3-11, or the wireless terminal 804 of FIG. 11) or to the control point 502 (FIGS. 6-10) using the P2P setup information 204 (FIG. 2) to inform other wireless terminals of the configuration and P2P capabilities of the wireless terminal 302a.

The terminal capabilities data structure 306 also includes a plurality of property types 902 and one or more property names 904 for each of the property types 902. Example property types 902 include a link mechanism type 906, a network configuration type 908, a services type 910, an alternate network discovery protocols type 912, an authentication type 914, a location type 916, and a device type 918. As shown, the terminal capabilities data structure 306 indicates that the link mechanism types 906 supported by the wireless terminal 302a include IEEE 802.11 ad-hoc mode, Wi-Fi P2P mode, direct link setup (DLS), Bluetooth® (BT), and Bluetooth® Alternate MAC and PHY (BT AMP). In addition, the terminal capabilities data structure 306 stores parameters associated with the network configuration 908 of the wireless terminal 302a that includes a DHCP-based IP address (or a static IP address if DHCP is not available), a netmask, a default gateway address, a DNS address, and a network address translation (NAT) address.

The types of services 910 supported by the wireless terminal 302a include a streaming service, a file exchange service, a gateway service, a sharing service, an emergency service access service, different QoS classes, and a voice over IP (VoIP) service. The alternate network discovery protocols 912 supported by the wireless terminal 302a include universal plug-n-play (UPnP), Bonjour, session description protocol (SDP), session initiation protocol (SIP), and universal description, discovery, and integration (UDDI). The authentication methods 914 supported by the wireless terminal 302a include an extensible authentication protocol (EAP) method (e.g., EAP over IEEE 802.1X) and a username/password method. The location type 916 parameters indicate whether the wireless terminal 302a supports acquiring geodetic location information (longitude, latitude, altitude) and/or civic location information (jurisdictional or postal street address) together with optional offsets (used to determine accurate indoor WLAN locations). In addition, the terminal capabilities data structure 306 indicates whether the wireless terminal 302a is a phone, a handheld, a computer, a printer, or a HiFi device. The property types 902 and the property names 904 are shown only by way of example. In other example implementations, fewer, more, or different property types and names may be stored in the terminal capabilities data structure 306.

FIG. 13 depicts the example CP management data structure 504 of FIG. 6 in detail. The CP management data structure 504 stores entries for different wireless terminals shown as terminal stations 1002 STA1, STA2, and STA3. In the illustrated example, STA1 refers to the wireless terminal 302a and STA2 refers to the wireless terminal 302b. In addition, for each wireless terminal, the CP management data structure 504 stores P2P capabilities and configuration information 1004. The P2P capabilities and configuration information 1004 can include one or more property names and configuration information stored in the terminal capabilities data structure 306 of FIGS. 3 and 12 and communicated (e.g., either transmitted directly in its entirety or indirectly (e.g., using a URI reference for later retrieval purposes) by wireless terminals to the control point 502. As also shown in FIG. 13, the CP management data structure 504 stores the P2P connection status indicators 1006 for each wireless terminal and service types 1008 hosted by the P2P connections.

In the illustrated example of FIG. 13, the CP management data structure 504 indicates that wireless terminal STA1 is connected to wireless terminal STA2, that wireless terminal STA3 does not have any current P2P connections, and that wireless terminals STA4-STA6 are connected via a multi-connection P2P session. The P2P connection status indicators 1006 indicate the wireless terminals that are connected and can include meta-info or metadata indicating how the P2P connections are made and the particulars of each connection (e.g., connection speed, duplex or simplex type, security, etc.). The service types 1008 depicted in FIG. 13 show that the P2P connection between wireless terminals STA1 and STA2 hosts a VoIP service and that the P2P connections between wireless terminals STA4-STA6 host an instant messaging (IM) service. In addition, while the wireless terminals STA4-STA6 are involved in an IM session, a simultaneously occurring P2P connection between the wireless terminals STA4 and STA5 hosts a VoIP service.

Although the P2P capabilities, configuration, and connection information is shown in FIG. 13 as stored in a single, integral data structure, database, or table. In other example implementations, the information shown in FIG. 13 can alternatively be stored in separate locations accessible via a network. In such example implementations, the CP management data structure 504 (and/or other data structure of the control point 502) can store indirect references such as URIs indicating where the information shown in FIG. 13 is stored on a network. In this manner, instead of communicating messages to wireless terminals including all of the P2P capabilities of other wireless terminals, the control point 502 can communicate URIs to wireless terminals seeking to discover P2P capabilities of other wireless terminals. Wireless terminals can the use the URIs to retrieve the P2P capabilities information from the locations indicated by the URIs. Thus, when the control point 502 is described herein as communicating P2P capabilities of wireless terminals to other wireless terminals, such P2P capabilities messages can alternatively include URIs for use by wireless terminals in accessing the P2P capabilities from other network locations instead of a listing of P2P capabilities.

Figure 14:
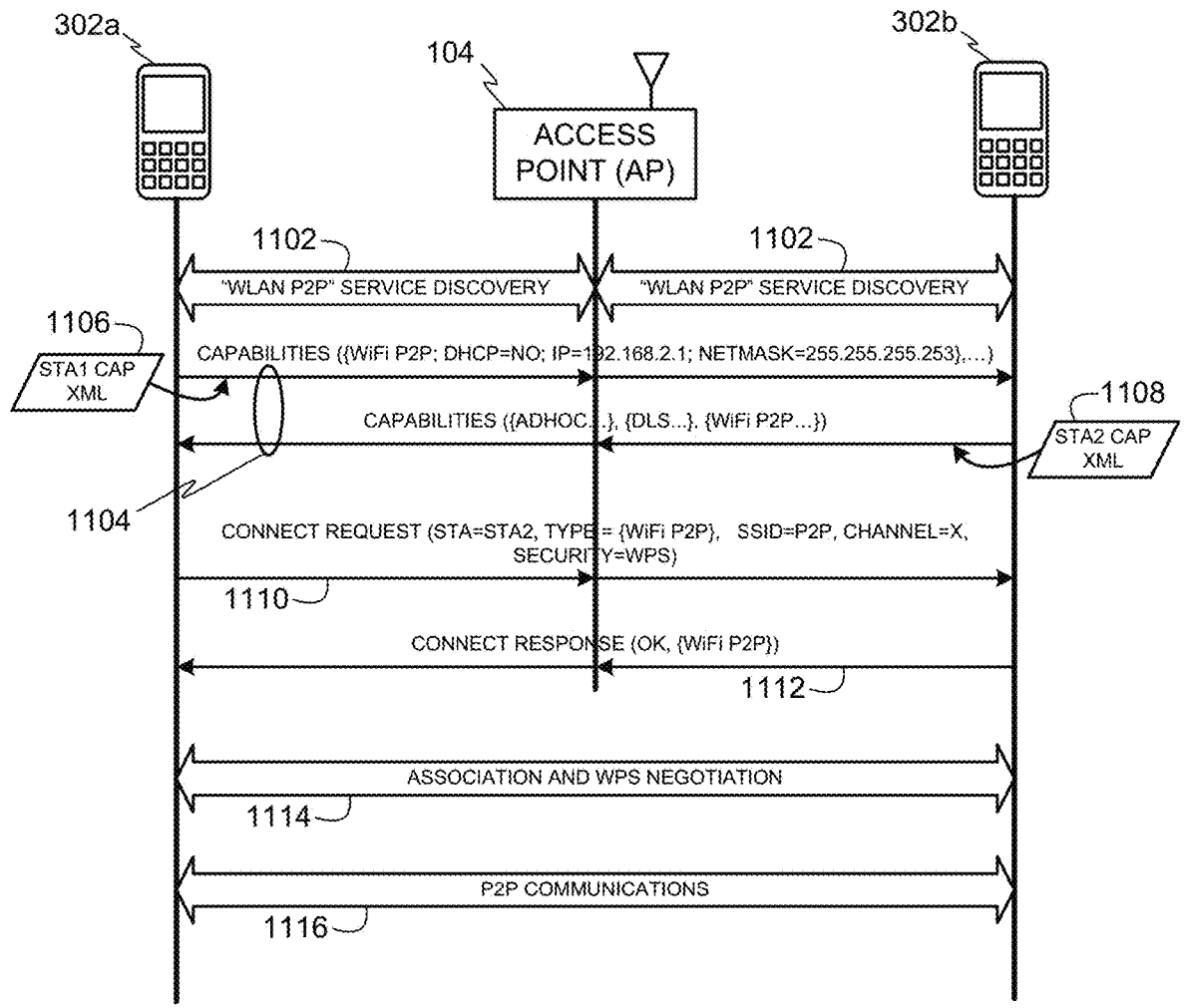
FIG. 14 depicts an example message flow diagram representative of communications between wireless terminals via a wireless access point to discover each other's P2P capabilities and establish a P2P connection.

FIG. 14 depicts an example message flow diagram representative of communications between the wireless terminals 302a-b via the wireless AP 104 to discover each other's P2P capabilities and establish a P2P connection. In the illustrated example, the P2P-capable wireless terminals 302a-b are initially connected or associated to a WLAN infrastructure network through the AP 104 using default IEEE 802.11 connection or link establishment procedures. Although the AP 104 is shown in FIG. 14 as an intermediary communication means for the wireless terminals 302a-b, in other example implementations, the wireless terminals 302a-b may connect through a network without the use of an AP as described above in connection with FIG. 5.

Initially, as shown in FIG. 14, the wireless terminals 302a-b broadcast P2P discovery messages 1102 seeking to discover and negotiate with other P2P-capable devices or services on the network via a specified network discovery protocol. For example, the network discovery protocol can be UPnP, Bonjour, SDP, SIP or a combination of these protocols. As a result of the P2P discovery messages 1102, the wireless terminals 302a-b discover one another. In addition, the wireless terminals 302a-b can optionally discover other dynamic aspects relating to the network associated with the AP 104 including, for example, whether a control point (e.g., the control point 502 of FIGS. 6-10) exists or other P2P services of the AP 104 are available within the WLAN infrastructure.

One or both of the wireless terminals 302a-b then launches a P2P network capability discovery protocol (e.g. an extensible markup language (XML) exchange) to communicate their P2P capabilities and configurations with one another. For example, each of the wireless terminals 302a-b can store a terminal capabilities data structure substantially similar to the terminal capabilities data structure 306 discussed above in connection with FIG. 12 to store its P2P capabilities and configuration information. The wireless terminals 302a-b then exchange capabilities messages 1104 including any QoS and/or class of service level requirements. In the illustrated example, the wireless terminal 302a communicates a STA1 P2P capabilities XML message 1106 and the wireless terminal 302b communicates a STA2 P2P capabilities XML, message 1108. An example instance of an XML schema (as defined by the World Wide Web Consortium (W3C)) that can be used to arrange the P2P capability and configuration information in the XML messages 1106 and 1108 is provided in FIGS. 17A-17C. The capabilities messages 1104 may include a list of supported P2P communications mechanisms, which could include: Wi-Fi P2P, Wi-Fi TDLS (IEEE 802.11z), IEEE 802.11 adhoc mode, Bluetooth®, Bluetooth® AMP, or single-hop mesh (IEEE 802.11s).

After the capabilities messages 1104 have been exchanged, and acknowledged, each of the wireless terminals 302a-b is able to associate and initiate a specific service type, without manual user configuration or involvement. Subsequent services can then be initiated by different applications on the wireless terminals 302a-b. In the illustrated example, the wireless terminal 302a sends a connect request message 1110 to the wireless terminal 302b with its selected service types, and the wireless terminal 302b responds with a connect response message 1112 acknowledging the selected service types and agreeing to connect. If the wireless terminals 302b determines that it cannot support or is not willing to support (e.g., due to user preference) a P2P connection type proposed by the wireless terminal 302a, the wireless terminal 302b can instead respond with a counter-proposal connect request message (not shown) in which the wireless terminal 302b rejects the P2P connection proposed by the wireless terminal 302a and proposes a different type of P2P connection (e.g., the same or a different P2P service with different parameters (e.g., authentication, speed, etc.)). In such instances, the wireless terminal 302a can respond with a connect response accepting the counter-proposed P2P connection or counter-propose different P2P connection parameters. Such P2P connection counter-proposals may also be used in connection with control points such as the control point 502 (FIGS. 6-10, 15, and 16).

While the illustrated example of FIG. 14 shows the connect request message 1110 separate from the capabilities messages 1104, in other example implementations, the volume of messages can be reduced by combining capabilities messages (e.g., either of the capabilities messages 1104 from the wireless terminal 302a-b) with connect request messages (e.g., the connect request message 1110 or a connect request message from the wireless terminal 302b). The same type of combined messaging can also be implemented in instances in which the control point 502 is used (FIGS. 6-10, 15, and 16). For example, the control point 502 can publish or proxy a combined capabilities and connect request message on behalf of the wireless terminal 302a to the wireless terminal 302b. Of course, a combined capabilities and connect request message can instead be communicated by the control point 502 on behalf of the wireless terminal 302b to the wireless terminal 302a.

To further reduce the volume of exchanged messages between the wireless terminals 302a-b, the wireless terminals 302a-b can cache one another's P2P capabilities and P2P capabilities received from any other wireless terminals. In this manner, during subsequent connections with one another, the wireless terminals 302a-b can refer to each other's P2P capabilities that they previously cached to negotiate and establish one or more P2P connections.

As shown in FIG. 14, after a P2P service type is agreed upon by the wireless terminals 302a-b for establishing a P2P connection, the wireless terminals 302a-b begin association and wireless provisioning service (WPS) negotiation communications 1114 with one another to provision a P2P connection with one another. The wireless terminals 302a-b can then send P2P communications 1116 to one another. In the illustrated example of FIG. 14, the negotiation communications 1114 and P2P communications occur directly between the wireless terminals 302a-b via a P2P connection without requiring the intermediary AP 104. However, P2P connections that do require an intermediary AP can also be established between the wireless terminals 302a-b via such an intermediary AP (e.g., the AP 104).

Figure 15:
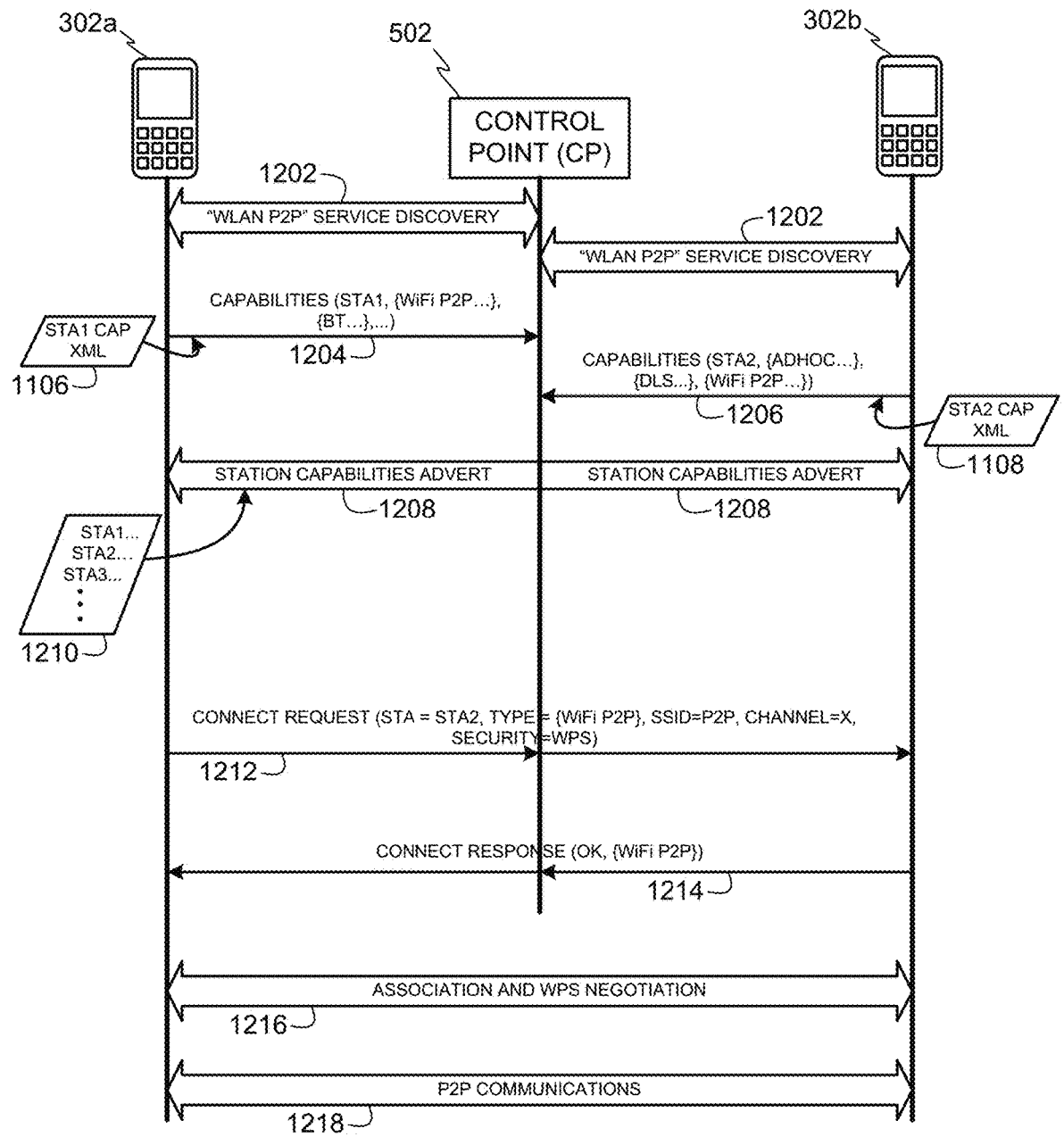
FIG. 15 depicts an example message flow diagram representative of communications between wireless terminals and a control point to discover each other's P2P capabilities and establish a P2P connection.

FIG. 15 depicts an example message flow diagram representative of communications between the wireless terminals 302a-b and the control point 502 to facilitate discovery of the P2P capabilities of the wireless terminals 302a-b and establish a P2P connection therebetween. Unlike the messaging exchanges depicted in FIG. 14 in which the wireless terminals 302a-b initially communicate with one another via the AP 104, in the illustrated example of FIG. 15, the wireless terminals 302a-b initially communicate with the control point 502 to discover one another on a WLAN infrastructure and to receive each other's P2P capabilities and configuration information from the control point 502. Although not shown, the wireless terminals 302a-b still communicate via an AP (e.g., the AP 104). However, such communications are initially directed or routed via the control point 502, which as described above in connection with FIGS. 6-10 can reside in a network, an AP, or a wireless terminal or can be a virtual control point formed of separately located control points.

Turning in detail to FIG. 15, after the wireless terminals 302a-b are associated with a WLAN infrastructure, they communicate broadcast P2P discovery messages 1202 seeking to discover and negotiate with other P2P-capable devices or services on the network. The P2P discovery messages 1202 are received by the control point 502 so that the control point 502 can create entries of the wireless terminals 302a-b in its CP management data structure 504 (FIGS. 6 and 13). The wireless terminals 302a-b then communicate respective P2P capabilities messages 1204 and 1206 including any QoS and/or class of service level requirements. In the illustrated example, the wireless terminal 302a can communicate its P2P capabilities message in the form of the STA1 capabilities XML message 1106 and the wireless terminal 302b can communicate its P2P capabilities message 1206 in the form of the STA2 capabilities XML message 1108. The control point 502 can receive the P2P capabilities messages 1204 and 1206 and store the respective capabilities in respective entries of the CP management data structure 504 for each of the wireless terminals 302a-b.

In some example implementations, the control point 502 can cache P2P capabilities information for different wireless terminals. In this manner, a wireless terminal need only publish its capabilities once during a first connection or association with the control point 502. When the wireless terminal subsequently connects to the control point 502, that wireless terminal need only publish any new or different P2P capabilities relative to its previously published P2P capabilities. In addition, wireless terminals can cache P2P capabilities of other wireless terminals. For instance, the wireless terminal 302b can cache the P2P capabilities of the wireless terminal 302a for use during subsequent connections with the wireless terminal 302a. In this manner, the control point 502 would need only forward the P2P capabilities of the wireless terminal 302a to wireless terminals that had not previously attempted to establish P2P connections with the wireless terminal 302a. In addition, any time the wireless terminal 302a has been provided with additional or different P2P capabilities, the control point 502 can communicate such changes to the wireless terminal 302b.

In the message flow of FIG. 15, the control point 502 broadcasts a station capabilities advertisement 1208 to the wireless terminals 302a-b and any other wireless terminal in communication with the control point 502. The station capabilities advertisement 1208 can be implemented using an XML message 1210 including the P2P capabilities and configurations of all the wireless terminals connected to the control point 502 and available for communicating via P2P connections. In the illustrated example of FIG. 15, when the wireless terminal 302a elects to establish a P2P connection with the wireless terminal 302b, the wireless terminal 302a communicates a connect request message 1212 to the wireless terminal 302b with its selected service types, and the wireless terminal 302b responds with a connect response message 1214 acknowledging the selected service types and agreeing to connect. In other example implementations, the connect request message 1212 and the connect response message 1214 can be communicated directly between the wireless terminals 302a-b without using the control point 502 as an intermediary service for these messages.

In some example implementations, to reduce the volume of communicated information, the control point 502 can be configured to defer publication of P2P capabilities via the station capabilities advertisement 1208 until there is some communication between two or more wireless terminals indicating an interest in establishing a P2P connection. Thus, prior to wireless terminals showing such interest (e.g., via a connect request message) in establishing a P2P connection, the control point 502 can communicate a notification including place-holders or indirect references such as URIs representative of the different wireless terminals in a network environment having some P2P capabilities. In some example implementations, when wireless terminals such as the wireless terminals 302a-b show some interest in establishing P2P connections, the wireless terminals 302a-b can exchange their P2P capabilities with one another while bypassing the control point 502 for this exchange. An advantage of this type of capabilities exchange is that while the control point 502 enables the wireless terminals 302a-b to discovery one another through notifications including indirect references (e.g., URIs), further resources of the control point 502 need not be spent on further negotiating P2P capabilities and connections between the wireless terminals 302a-b.

Returning to the illustrated example of FIG. 15, after a P2P service type is agreed upon by the wireless terminals 302a-b for establishing a P2P connection, the wireless terminals 302a-b begin association and wireless provisioning service (WPS) negotiation communications 1216 directly with one another without communicating via the control point 502. In this manner, the wireless terminals 302a-b can associate and provision a P2P connection with one another. The wireless terminals 302a-b can then communicate with one another via P2P communications 1218.

Figure 16:
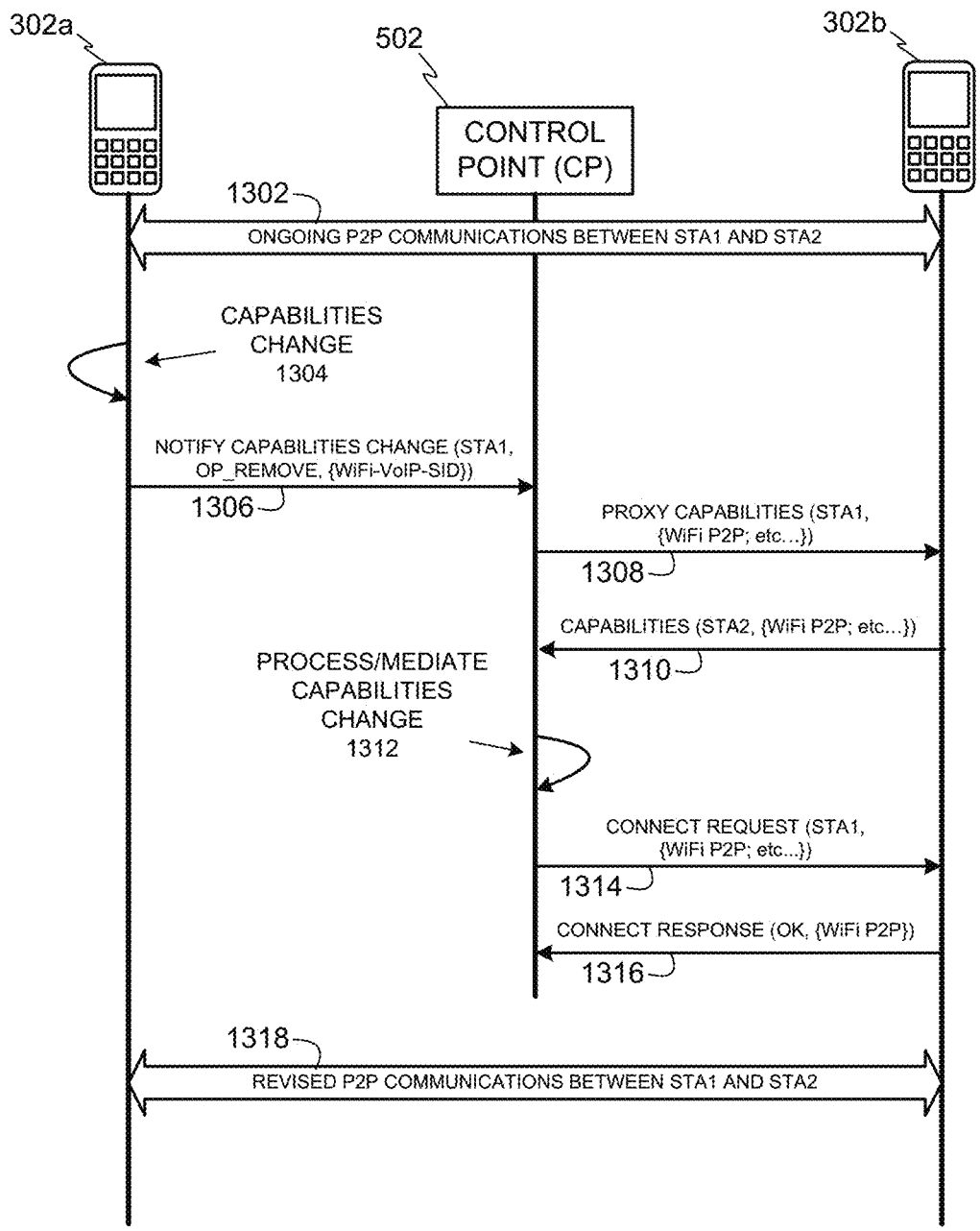
FIG. 16 depicts an example message flow diagram representative of a P2P capabilities dynamic update process facilitated by the control point of FIGS. 6-10 and 15.

FIG. 16 depicts an example message flow diagram representative of a P2P capabilities dynamic update process facilitated by the control point 502. As shown, the wireless terminals 302a-b have ongoing P2P communications 1302 as a result of a previous P2P capabilities exchange (e.g., the messaging exchange of FIG. 15). During the ongoing P2P communications 1302, the wireless terminal 302a undergoes a state or environmental change 1304. In the illustrated example, the wireless terminal 302a detects a calendar event (e.g., a meeting time) and, as a result, the wireless terminal 302a is placed into a silent mode. In response to detecting the state or environmental change, the wireless terminal 302a communicates a capabilities change notification 1306 to the control point 502. The control point 502, in turn, stores the updated capabilities and communicates the capabilities through a proxied capabilities exchange update 1308 to other devices or elements (e.g., the wireless terminal 302b) within the WLAN infrastructure. In response, the other devices or elements such as the wireless terminal 302b re-communicate their capabilities information 1310 to the control point 502.

The control point 502 then processes and mediates the exchanged revised/proxied capabilities 1312. That is, the control point 502 can manage the capabilities that the wireless terminals 302a-b have advertised. For example, the control point 502 can enforce policies between the wireless terminals 302a-b (i.e., policing the P2P connection). Such policy enforcement can include re-offering and/or re-submitting requests to the wireless terminals 302a-b to re-establish or revise P2P connections using the appropriate revised capabilities. In some example implementations, policies may be used to limit the type and/or breadth of capabilities provided to other wireless terminals (e.g., to ensure that the other wireless terminals are unable to invoke services with an originating wireless terminal (e.g., a voice call)).

Once capabilities have been re-established, a series of one or more connection requests for respective P2P communications are sent by the control point 502 on behalf of the wireless terminal 302a. In the illustrated example, the control point 502 sends a revised connect request message 1314 to the wireless terminal 302b to update the ongoing P2P connection between the wireless terminals 302a-b. In turn, the wireless terminal 302b communicates a connect response message 1316 to the control point 502. The request 1314 and response 1316 negotiate the capabilities to be used with the available P2P communication path. In this manner, the wireless terminals 302a-b can continue to communicate via a P2P connection using revised P2P communications 1318. In the illustrated example, the ongoing P2P communications 1302 between the wireless terminals 302*a-b* were capable of carrying VoIP communications. However, the state change of the wireless terminal 302*a* causes the wireless terminal 302*a* to no longer support VoIP communications while its user is in a meeting. Thus, the revised P2P communications 1318 support only instant messaging (IM) communications while the user of the wireless terminal 302*a* is in the meeting.

The updates depicted in FIG. 16 may also be triggered by state or environmental changes to a WLAN environment without any direct interaction or involvement by the user of a wireless terminal. For instance, such WLAN environment changes could include an AP being re-configured or taken out of service, a new service being provisioned with the WLAN (e.g., voice or streaming media services), a WLAN service being shutdown due to preventative maintenance, or a WLAN printing device or service no longer being accessible due to factors such as low-toner, out-of-paper, etc.

Turning now to FIGS. 17A-17C, an example XML schema 1400 for use in arranging P2P capabilities and configuration information communicated between wireless terminals (e.g., the wireless terminals 302*a-b*) is provided. The schemata 1400 could be defined by a standards organization, wireless service providers, carriers, network operators, device manufacturers, etc. From time to time, the structure of the schemata 1400 may change to enable additional P2P capabilities.

An example XML-based P2P capabilities message 1500 is illustrated in FIGS. 18A and 18B. The XML-based P2P capabilities message 1500 is implemented in accordance with the defined XML schema 1400. Alternatively, the XML-based P2P capabilities message 1500 could be based on an XML Document Type Definition (DTD) or a combination of XML Schema and Resource Description Framework (RDF) XML constructs. The XML-based P2P capabilities message 1500 indicates P2P capabilities and services accessible via an AP (e.g., the AP 104). For example, the AP 104 may be in communication with one or more P2P services including VoIP services, printing services, streaming media services, emergency calling services, etc. that can communicate via P2P connections with wireless terminals (e.g., the wireless terminals 302*a-b*). In some example implementations, the information in the XML-based P2P capabilities message 1500 could be provisioned from a central component, relay, or infrastructure (e.g. a BlackBerry® Enterprise Server (BES) component). Such a central configuration component can control P2P connectivity through a configuration channel using, for example, some higher layer protocol such as OMA DM or it could be established through some type of proprietary (non-standard) network provisioning system. Alternatively, the XML-based P2P capabilities message 1500 may also be populated and updated based on dynamic detection of P2P capabilities or services (e.g., without overt provisioning) accessible via the AP 104.

In the illustrated example of FIGS. 18A and 18B, the XML-based P2P capabilities message 1500 indicates that a P2P WLAN infrastructure accessible via the AP 104 supports two ad-hoc links with prefixes 'AH-Link1', 'AH_Link2' (the second link being of a specified link type, that is 'WiFi P2P'). The XML-based P2P capabilities message 1500 also indicates that the WLAN is configured as an IPV4 based network using DHCP and based on an IP subnet represented as an IP address and subnet mask (e.g., subnet 192.168.15.0 mask 255.255.255.0 (192.168.15.0/24)). Pre-provisioned services are shown as including a Skype™ VoIP service with a class-of-service defined as 'WiFi:Voice', an emergency services access platform, and a clock service. In the illustrated example, both the WiFi and clock services are directly able to make use of IPV4 multicasting over Simple Service Discovery Protocol (SSDP), while the emergency services access platform may use some other (as yet undefined or yet to be determined) discovery scheme. In addition, alternate discovery protocols including UPnP are specified and a mapping is provided for the Skype™ VoIP service and for any service containing the word 'Print' in its identifier (e.g., a printing service identified as 'PrintingService'). In the illustrated example, Bonjour discovery protocol is another alternative. The Bonjour service may be applied to the statically defined clock service or any service with the word 'Time' in its identifier (e.g., a time synchronization service identified as 'NetworkTime').

Figure 19:
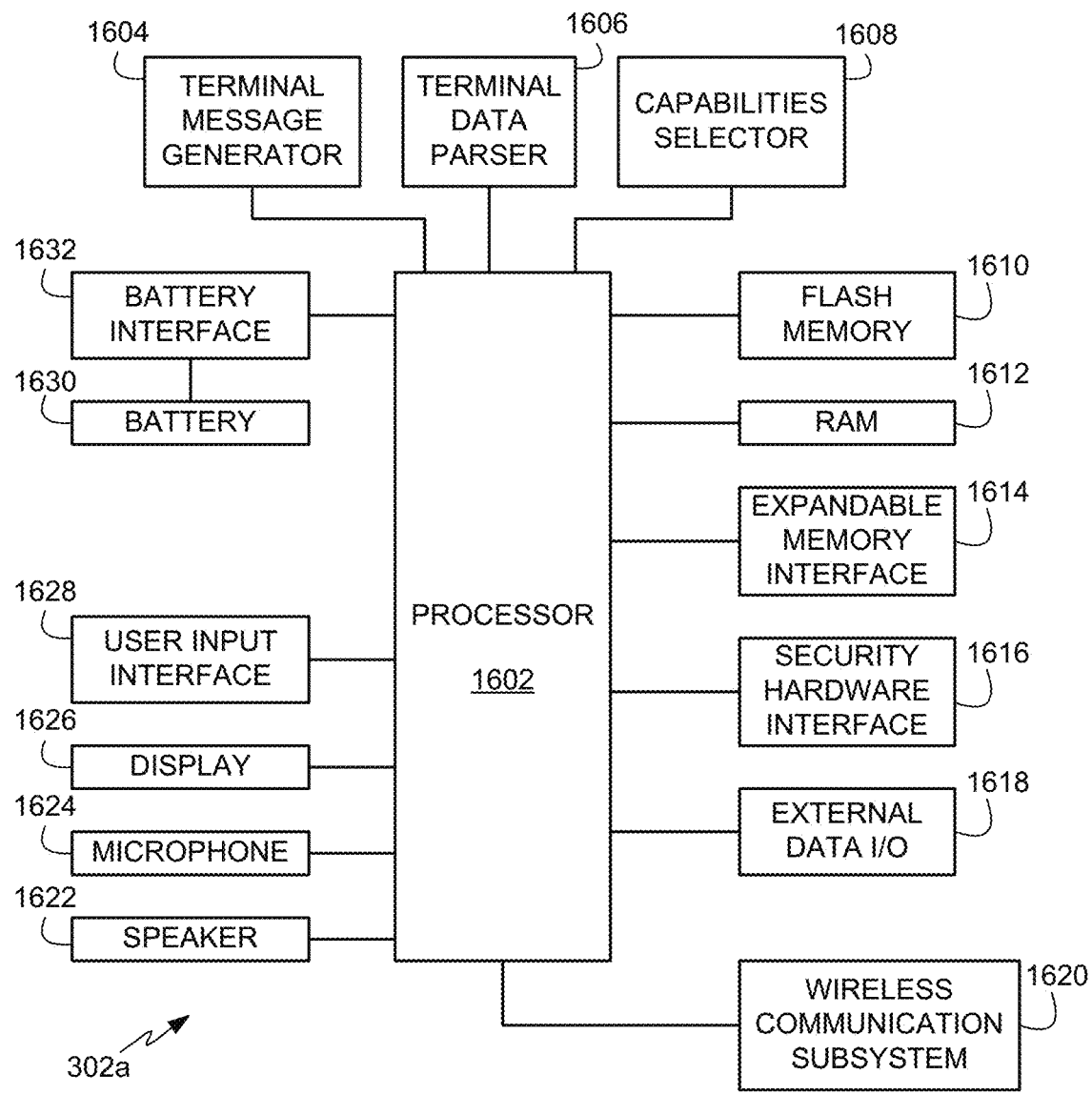
FIG. 19 depicts a block diagram of an example wireless terminal that can be used to implement the example methods and apparatus described herein.

Referring now to FIG. 19, an illustrated example of the wireless terminal 302*a* of FIGS. 3-11 and 14-16 is shown in block diagram form. The wireless terminal 302*b* and any other P2P capable device configured to implement the example techniques described herein can be implemented in similar fashion. In the illustrated example, the wireless terminal 302*a* includes a processor 1602 that may be used to control the overall operation of the wireless terminal 302*a*. The processor 1602 may be implemented using a controller, a general purpose processor, a digital signal processor, dedicated hardware, or any combination thereof.

The wireless terminal 302*a* also includes a terminal message generator 1604 and a terminal data parser 1606. The terminal message generator 1604 may be used to generate messages including the P2P setup information 204 of FIG. 2. The terminal data parser 1606 may be used to retrieve information from memory (e.g., a RAM 1612). For example, the terminal data parser 1606 can retrieve ones of the P2P capabilities parameters and configuration information discussed above in connection with the terminal capabilities data structure 306. For instance, when the wireless terminal 302*a* receives a P2P capabilities message (e.g., the STA2 capabilities XML message 1108), the capabilities and configuration information can be stored in a memory of the wireless terminal 302*a* and retrieved from the memory by the terminal data parser 1606.

The wireless terminal 302*a* also includes a capabilities selector 1608 to select modes, protocols, services or other P2P setup information for use in negotiating and establishing a P2P connection with another P2P-capable wireless terminal or service. The capabilities selector 1608 may be configurable to select communication modes or parameters based on different factors or criteria including, for example, user preferences, wireless terminal resources, WLAN infrastructure resources, wireless service provider restrictions, P2P application requirements (e.g., media streaming, file transfers, PIM synchronization, etc.), etc.

Although the terminal message generator 1604, the terminal data parser 1606, and the capabilities selector 1608 are shown as separate from and connected to the processor 1602 in FIG. 19, in some example implementations, the terminal message generator 1604, the terminal data parser 1606, and the capabilities selector 1608 may be implemented in the processor 1602 and/or in a wireless communication subsystem (e.g., a wireless communication subsystem 1620). The terminal message generator 1604, the terminal data parser 1606, and the capabilities selector 1608 may be implemented using any desired combination of hardware, firmware, and/or software. For example, one or more integrated circuits, discrete semiconductor components, and/or passive electronic components may be used. Thus, for example, the terminal message generator 1604, the terminal data parser 1606, and the capabilities selector 1608, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The terminal message generator 1604, the terminal data parser 1606, and the capabilities selector 1608, or parts thereof, may be implemented using instructions, code, and/or other software and/or firmware, etc. stored on a machine accessible medium and executable by, for example, a processor (e.g., the example processor 1602). When any of the appended claims are read to cover a purely software implementation, at least one of the terminal message generator 1604, the terminal data parser 1606, or the capabilities selector 1608 is hereby expressly defined to include a tangible medium such as a solid state memory, a magnetic memory, a DVD, a CD, etc.

The example wireless terminal 302a shown in FIG. 19 also includes a FLASH memory 1610, a random access memory (RAM) 1612, and an expandable memory interface 1614 communicatively coupled to the processor 1602. The FLASH memory 1610 can be used to, for example, store computer readable instructions and/or data. In some example implementations, the FLASH memory 1610 can be used to store one or more of the data structures discussed above in connection with FIGS. 3, 6, 12, 13-15, 17A-17C, 18A, and 18B associated with the wireless terminal 302a and/or the control point 502 when implemented using the wireless terminal 302a. The RAM 1612 can also be used to, for example, store data and/or instructions. In addition, instructions used to implement the control point 502 could be stored in the FLASH memory 1610 and/or in the RAM 1612. In some example implementations, the instructions for the control point 502 could be stored in expandable memory and indirectly addressable via the expandable memory interface 1614. In any case, the functions forming the operation of the control point 502 would be executed either in whole or in part by the processor 1602 executing the instructions.

The wireless terminal 302a is provided with a security hardware interface 1616 to receive a SIM card from a wireless service provider. A SIM card may be used to provide P2P capabilities allowed by a service provider for use by the wireless terminal 302a to establish P2P connections with other P2P-capable devices or services. The wireless terminal 302a is also provided with an external data I/O interface 1618. The external data I/O interface 1618 may be used by a user to transfer information to and from the wireless terminal 302a through a wired medium.

The wireless terminal 302a is provided with a wireless communication subsystem 1620 to enable wireless communications with WLAN APs (e.g., the AP 104) and other wireless terminals (e.g., the wireless terminal 302b). Although not shown, the wireless terminal 302a may also have a long-range communication subsystem to receive messages from, and send messages to, a cellular wireless network. In the illustrated examples described herein, the wireless communication subsystem 1620 can be configured in accordance with the IEEE® 802.11 standard. In other example implementations, the wireless communication subsystem 1620 can be implemented using a BLUETOOTH® radio, a ZIGBEE® device, a wireless USB device, or an ultra-wideband (UWB) radio (e.g., WiMax).

To enable a user to use and interact with or via the wireless terminal 302a, the wireless terminal 302a is provided with a speaker 1622, a microphone 1624, a display 1626, and a user input interface 1628. The display 1626 can be an LCD display, an e-paper display, etc. The user input interface 1628 could be an alphanumeric keyboard and/or telephone-type keypad, a multi-direction actuator or roller wheel with dynamic button pressing capability, a touch panel, etc. As discussed above, the example methods and apparatus described herein can also be advantageously used in connection with wireless terminals that do not have user interfaces and, thus, the speaker 1622, the microphone 1624, the display 1626, the user input interface 1628, and/or any combination thereof may be optionally omitted. In the illustrated example, the wireless terminal 302a is a battery-powered device and is, thus, provided with a battery 1630 and a battery interface 1632.

Figure 20:
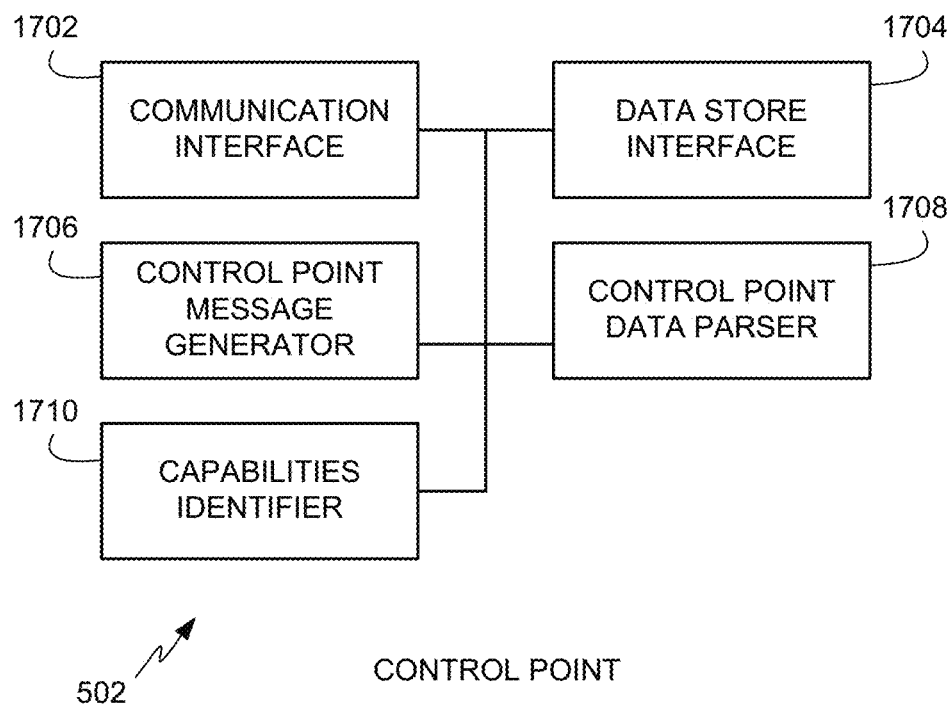
FIG. 20 depicts a block diagram of an example control point that can be used to facilitate P2P capabilities discovery and P2P connections between wireless terminals.

Turning now to FIG. 20, an example of the control point 502 is shown in block diagram form. As shown, the control point 502 includes a communication interface 1702, a data store interface 1704, a control point message generator 1706, a control point data parser 1708, and a capabilities identifier 1710. The communication interface 1702, the data store interface 1704, the control point message generator 1706, the control point data parser 1708, and the capabilities identifier 1710 may be implemented using any desired combination of hardware, firmware, and/or software. For example, one or more integrated circuits, discrete semiconductor components, and/or passive electronic components may be used. Thus, for example, the communication interface 1702, the data store interface 1704, the control point message generator 1706, the control point data parser 1708, and the capabilities identifier 1710, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The communication interface 1702, the data store interface 1704, the control point message generator 1706, the control point data parser 1708, and the capabilities identifier 1710, or parts thereof, may be implemented using instructions, code, and/or other software and/or firmware, etc. stored on a machine accessible medium and executable by, for example, a processor (e.g., the example processor 1602 of FIG. 19). When any of the appended claims are read to cover a purely software implementation, at least one of the communication interface 1702, the data store interface 1704, the control point message generator 1706, the control point data parser 1708, or the capabilities identifier 1710 is hereby expressly defined to include a tangible medium such as a solid state memory, a magnetic memory, a DVD, a CD, etc.

Turning in detail to FIG. 20, to exchange communications with P2P-capable devices or services (e.g., the wireless terminals 302a-b), the control point 502 is provided with the communication interface 1702. To store and retrieve P2P capabilities and configuration information and P2P connection status information to and from a memory, the control point 502 is provided with the data store interface 1704. For example, the data store interface 1704 can enable the control point 502 to access the control point management data structure 504 of FIGS. 6 and 13. To generate messages, the control point 502 is provided with the control point message generator 1706. To retrieve P2P capabilities and other information received from P2P-capable devices or services via capabilities messages, the control point 502 is provided with a control point data parser 1708. To identify different P2P capabilities associated with different P2P-capable devices and services and received via capabilities messages, the control point 502 is provided with the capabilities identifier 1710.

FIGS. 21A, 21B, 22, and 23 depict example flow diagrams representative of example processes that may be implemented using computer readable instructions that may be used to exchange P2P capabilities and configuration information and establish P2P connections between P2P-capable devices and/or services. The example operations of FIGS. 21A, 21B, 22, and 23 may be performed using a processor, a controller and/or any other suitable processing device. For example, the example operations of FIGS. 21A, 21B, 22, and 23 may be implemented using coded instructions stored on a tangible medium such as a flash memory, a read-only memory (ROM) and/or random-access memory (RAM) associated with a processor (e.g., the processor 1602 of FIG. 19). Alternatively, some or all of the example operations of FIGS. 21A, 21B, 22, and 23 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example operations of FIGS. 21A, 21B, 22, and 23 may be implemented manually or as any combination(s) of any of the foregoing techniques, for example, any combination of firmware, software, discrete logic and/or hardware. Further, although the example operations of FIGS. 21A, 21B, 22, and 23 are described with reference to the flow diagrams of FIGS. 21A, 21B, 22, and 23, other methods of implementing the operations of FIGS. 21A, 21B, 22, and 23 may be employed. For example, the order of execution of the blocks may be changed, and/or some of the blocks described may be changed, eliminated, sub-divided, or combined. Additionally, any or all of the example operations of FIGS. 21A, 21B, 22, and 23 may be performed sequentially and/or in parallel by, for example, separate processing threads, processors, devices, discrete logic, circuits, etc.

Figure 21A:
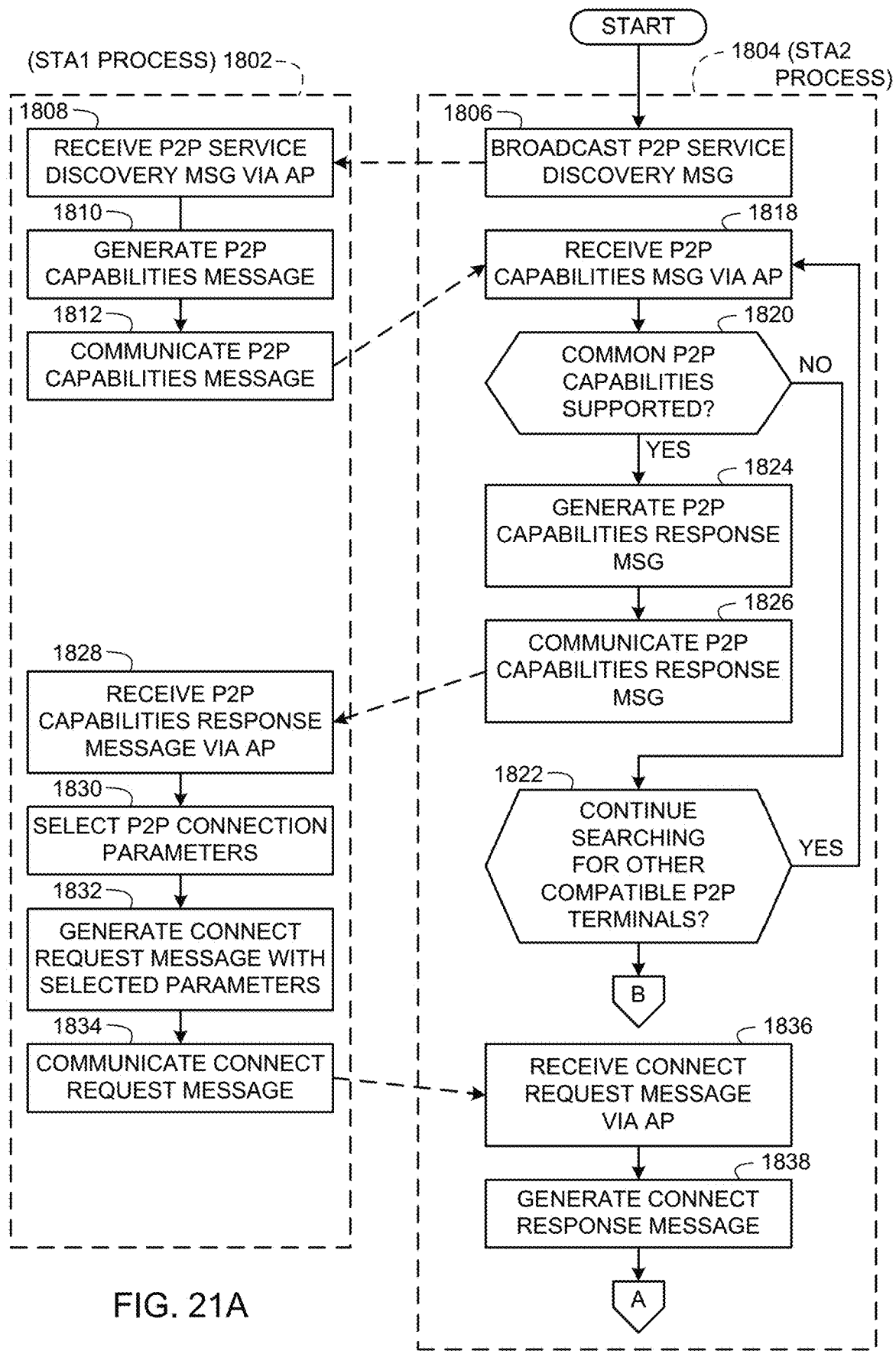
FIGS. 21A and 21B depict a flow diagram representative of example processes, which may be implemented using computer readable instructions to discover P2P capabilities and establish P2P connections between wireless terminals.
Figure 21B:
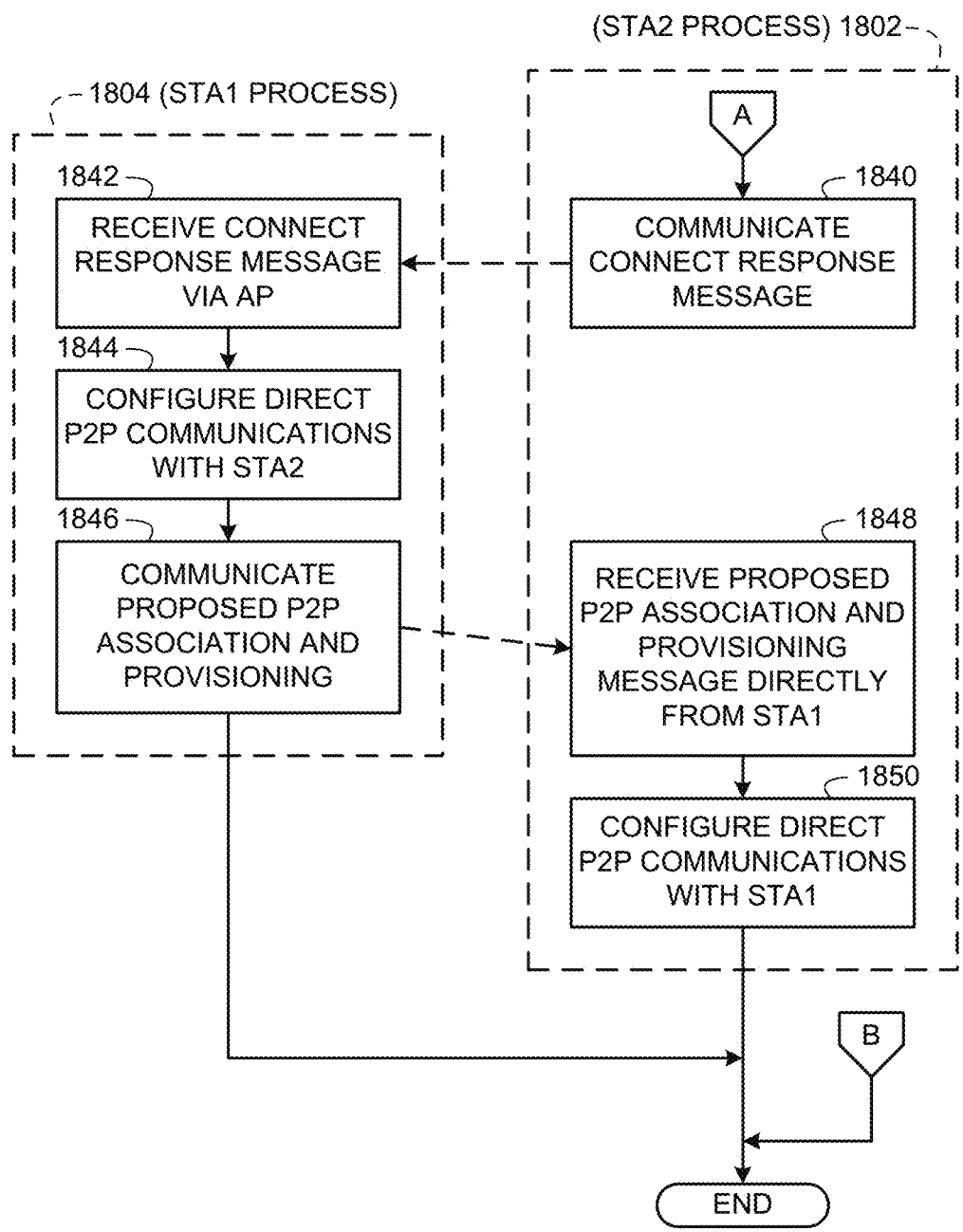

The example flow diagrams of FIGS. 21A and 21B include a STA1 process 1802 and an STA2 process 1804 that cooperatively interact to facilitate communication between the wireless terminals 302*a* and 302*b*. In the illustrated example, the STA1 process 1802 is implemented using the wireless terminal 302*a* and the STA2 process 1804 is implemented using the wireless terminal 302*b*. The flow diagram of FIGS. 21A and 21B is described in connection with the example message flow of FIG. 14 and can be performed without use of the control point 502.

Turning in detail to FIGS. 21A and 21B, initially, the wireless terminal 302*b* broadcasts the P2P discovery message 1102 of FIG. 14 (block 1806) (FIG. 21A) to discover other P2P-capable devices in communication with the same WLAN infrastructure as the wireless terminal 302*b*. In the illustrated example, the wireless terminal 302*b* receives the P2P discovery message via the AP 104 (block 1808). The terminal message generator 1604 generates a P2P capabilities message (block 1810) in the form of the STA1 P2P capabilities message 1106 of FIG. 14, and the wireless terminal 302*a* communicates the STA1 P2P capabilities message 1106 to the wireless terminal 302*b* (block 1812). Any wireless terminal that receives the P2P discovery message 1102 broadcasted by the wireless terminal 302*b* and that does not support P2P communications ignores the received broadcasted message and, therefore, the process would end without any further operations.

The wireless terminal 302*b* receives the STA1 P2P capabilities message 1106 via the AP 104 (block 1818). A terminal data parser (e.g., similar to the terminal data parser 1606 of FIG. 19) of the wireless terminal 302*b* identifies the P2P capabilities indicated in the STA1 P2P capabilities message 1106, and the wireless terminal 302*b* determines whether it supports any common or compatible P2P capabilities (block 1820). If the wireless terminal 302*b* does not support any compatible P2P capabilities (block 1820), the wireless terminal 302*b* can continue to search for other compatible P2P devices or services (block 1822), in which case, control returns to block 1818 to receive another P2P capabilities message from another device or service. Alternatively, if the wireless terminal 302*b* does not support any compatible P2P capabilities (block 1820), the process could end without further operations if the wireless terminal 302*b* is not to receive other P2P capabilities messages. Such a process termination could be a matter of choice based on, for example, a user preference or a user supplied response to a message indicating that no P2P capabilities of the wireless terminal 302*a* matched P2P capabilities of the wireless terminal 302*b*.

If the wireless terminal 302*b* does support one or more common or compatible P2P capabilities, a terminal message generator of the wireless terminal 302*b* generates a capabilities response message (block 1824) in the form of the STA2 P2P capabilities XML message 1108 of FIG. 14. The wireless terminal 302*b* then communicates the STA2 P2P capabilities XML message 1108 (block 1826) to the wireless terminal 302*a*.

The wireless terminal 302*a* receives the STA2 P2P capabilities XML message 1108 via the AP 104 (block 1828). The capabilities selector 1608 then selects P2P connection parameters (e.g., the P2P modes and configurations) to propose to the wireless terminal 302*b* for establishing a P2P connection between the wireless terminals 302*a-b* (block 1830). Such P2P capabilities selection can be based on one or more criteria or factors including, for example, wireless terminal resources, WLAN infrastructure resources, wireless service provider restrictions, P2P application requirements (e.g., media streaming, file transfers, PIM synchronization, etc.), user preference, etc. The terminal message generator 1604 of FIG. 19 generates the connect request message 1110 of FIG. 14 with the selected P2P parameters (block 1832), and the wireless terminal 302*a* communicates the connect request message 1110 to the wireless terminal 302*b* (block 1834).

The wireless terminal 302*b* receives the connect request message 1110 via the AP 104 (block 1836) and generates the connect response message 1112 of FIG. 14 (block 1838). For example, if the P2P capabilities and configuration information including a minimum QoS and/or class of service level are acceptable to the wireless terminal 302*b*, then the wireless terminal 302*b* can agree to establish a P2P connection with the wireless terminal 302*a* based on the proposed P2P capabilities and configuration information. The wireless terminal 302*b* then communicates the connect response message 1112 to the wireless terminal 302*a* (block 1840) (FIG. 21B).

The wireless terminal 302*a* receives the connect response message 1112 via the AP 104 (block 1842) and configures a profile for direct P2P communications with the wireless terminal 302*b* (i.e., STA2) (block 1844). For example, the wireless terminal 302*a* can provision a P2P connection using the IP address of the wireless terminal 302*b* and/or any other information required by the agreed upon P2P mode of communication. The wireless terminal 302*a* then communicates a proposed P2P association and provisioning message to the wireless terminal 302*b* (block 1846).

The wireless terminal 302*b* receives the proposed P2P association and provisioning message from the wireless terminal 302*a* (i.e., STA1) (block 1848) and configures a profile for direct P2P communications with the wireless terminal 302*a* (block 1850). In this manner, the wireless terminals 302*a-b* establish a P2P connection (e.g., the P2P connection 304 of FIG. 3 or 406 of FIG. 4). Although a single P2P association and provisioning exchange is shown in connection with blocks 1846 and 1848, such association and provisioning may require more than one messaging exchange to establish a P2P connection. After the P2P connection is established or if the wireless terminal 302b determines that it should not continue to search for any other P2P-capable devices (block 1822 (FIG. 21A)), the example processes of FIGS. 21A and 21B end.

Figure 22:
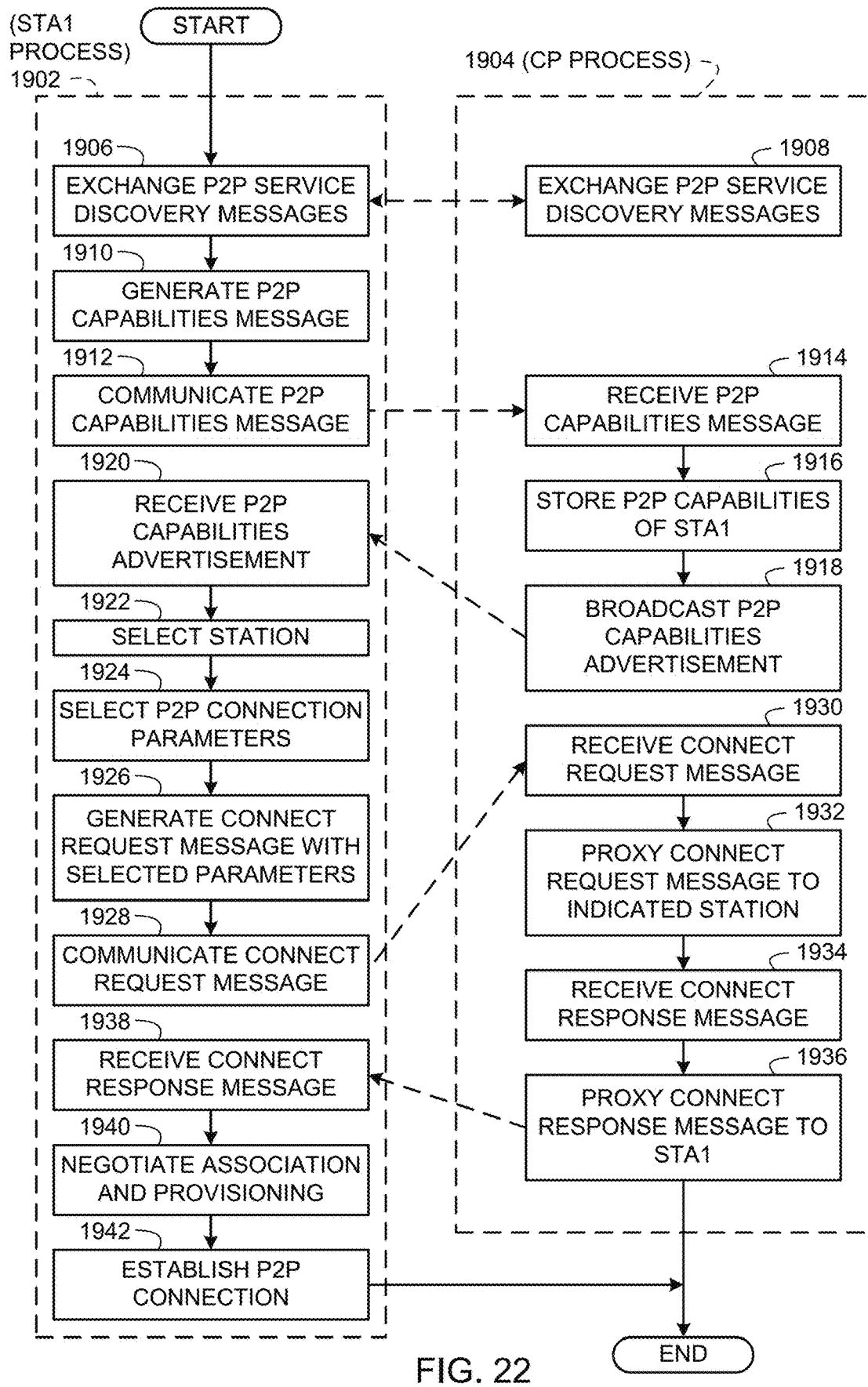
FIG. 22 depicts a flow diagram representative of example processes, which may be implemented using computer readable instructions to discover P2P capabilities using a control point and establish P2P connections between wireless terminals.

FIG. 22 depicts a flow diagram representative of example processes, which may be implemented using computer readable instructions to discover P2P capabilities using the control point 502 and establish P2P connections between wireless terminals (e.g., the wireless terminals 302a-b). In the illustrated example, an STA1 process 1902 is implemented using the wireless terminal 302a and a CP process 1904 is implemented using the control point 502. The flow diagram of FIG. 22 is described in connection with the example message flow of FIG. 15.

Turning in detail to FIG. 22, initially, the wireless terminal 302a and the control point 502 exchange the broadcasted P2P discovery messages 1202 of FIG. 15 (blocks 1906 and 1908) to allow the wireless terminal 302a to discover other P2P-capable devices in communication with the same WLAN infrastructure as the wireless terminal 302a. The terminal message generator 1604 generates a P2P capabilities message (block 1910) in the form of the STA1 P2P capabilities message 1106 of FIG. 15, and the wireless terminal 302a communicates the STA1 P2P capabilities message 1106 to the control point 502 (block 1912).

The control point 502 receives the STA1 P2P capabilities message 1106 (block 1914), and the data store interface 1704 (FIG. 20) stores the P2P capabilities of the wireless terminal 302a in a data structure (e.g., the CP management data structure 504 of FIGS. 6 and 13) (block 1916). The control point 502 then broadcasts the P2P capabilities advertisement 1208 (FIG. 15) indicative of the P2P capabilities of all available wireless terminals and P2P-capable services in communication with the control point 502 (block 1918). For example, the data store interface 1704 can retrieve the P2P capabilities and corresponding wireless terminal identifiers from the CP management data structure 504, and the control point message generator 1706 can generate the P2P capabilities advertisement 1208.

The wireless terminal 302a receives the P2P capabilities advertisement 1208 from the control point 502 (block 1920). The capabilities selector 1608 (FIG. 19) then selects a station, wireless terminal or service with which to connect (block 1922) based on the advertisement 1208. In the illustrated example, the wireless terminal 302a selects to connect with the wireless terminal 302b. In addition, the capabilities selector 1608 selects P2P connection parameters (e.g., the P2P modes and configurations) to propose to the wireless terminal 302b for establishing a P2P connection between the wireless terminals 302a-b (block 1924). Such P2P capabilities selection can be based on one or more criteria or factors including, for example, wireless terminal resources, WLAN infrastructure resources, wireless service provider restrictions, P2P application requirements (e.g., media streaming, file transfers, PIM synchronization, etc.), user preference, etc. The terminal message generator 1604 (FIG. 19) generates the connect request message 1212 of FIG. 15 with the selected P2P parameters (block 1926), and the wireless terminal 302a communicates the connect request message 1212 to the control point 502 (block 1928).

The control point 502 receives the connect request message 1212 (block 1930) and proxies the connect request message to the indicated station (block 1932). In the illustrated example, the indicated station is the wireless terminal 302b. The control point 502 then receives the connect response message 1214 (FIG. 15) from the wireless terminal 302b (block 1934) and proxies the connect response message 1214 to the wireless terminal 302a (i.e., STA1) (block 1936).

The wireless terminal 302a receives the connect response message 1214 (block 1938). The wireless terminal 302a negotiates association and provisioning directly with the wireless terminal 302b (block 1940) without using the control point 502 and establishes a P2P connection with the wireless terminal 302b (block 1942). The example processes of FIG. 22 then end.

Figure 23:
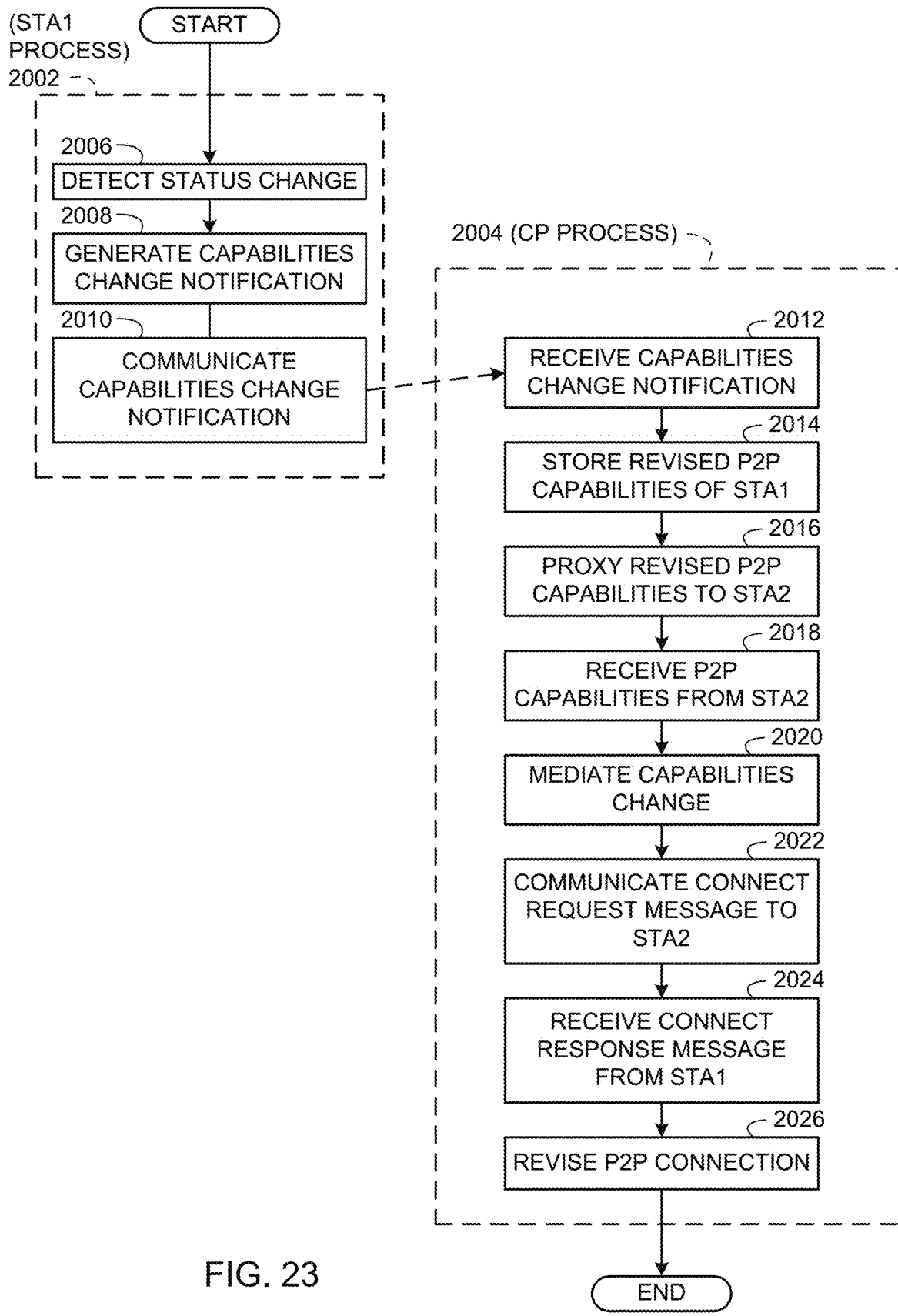
FIG. 23 depicts a flow diagram representative of example processes, which may be implemented using computer readable instructions to dynamically update P2P capabilities of wireless terminals using a control point and update established P2P connections between wireless terminals.

FIG. 23 depicts a flow diagram representative of example processes, which may be implemented using computer readable instructions to dynamically update P2P capabilities of wireless terminals using the control point 502 and update established P2P connections between those wireless terminals. In the illustrated example, an STA1 process 2002 is implemented using the wireless terminal 302a and a CP process 2004 is implemented using the control point 502. The flow diagram of FIG. 23 is described in connection with the example message flow of FIG. 16. Initially, the wireless terminal 302a detects a state change that affects the corresponding composition of P2P service types and/or P2P capabilities of the wireless terminal 302a (block 2006). The terminal message generator 1604 generates a revised P2P capabilities message (block 2008) in the form of the capabilities change notification 1306 of FIG. 16, and the wireless terminal 302a communicates the capabilities change notification 1306 to the control point 502 (block 2010).

The control point 502 receives the capabilities change notification 1306 (block 2012) and stores the revised P2P capabilities of the wireless terminal 302a (i.e., STA1) (either directly or indirectly via a URI) in the CP management data structure 504 of FIGS. 6 and 13 (block 2014). The control point 502 then proxies the revised P2P capabilities to the wireless terminal 302b (i.e., STA2) (block 2016) and receives a P2P capabilities message from the wireless terminal 302b (block 2018). The control point 502 mediates the P2P capabilities change (block 2020) by, for example, ensuring that the wireless terminals 302a-b still have common or compatible P2P capabilities and by forming the revised connect request message 1314 (FIG. 16) based on the changed P2P capabilities to revise the P2P connection between the wireless terminals 302a-b. The control point 502 then communicates a revised connect request message 1314 on behalf of the wireless terminal 302a to the wireless terminal 302b (block 2022) and receives the connect response message 1316 (FIG. 16) from the wireless terminal 302b (block 2024). If the wireless terminal 302b agrees to the revised P2P connection, the control point 502 revises the P2P connection between the wireless terminals 302a-b (block 2026). The processes of FIG. 23 then end.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for peer-to-peer (P2P) communication in a wireless local area network (WLAN), the method comprising:

communicating, from a first peer wireless station (STA1), first peer capability information to a second peer wireless station (STA2) using a capability discovery protocol request, wherein the first peer capability information describes the STA1's capability information for a P2P connection between the STA1 and the STA2;

receiving second peer capability information from the STA2 using a capability discovery protocol response, wherein the second peer capability information describes the STA2's capability information for the P2P connection, wherein the second peer capability information includes a counter-proposal of the first peer capability information sent by the STA1 based on a capability of the STA2 for P2P communication; and establishing, by the STA1, the P2P connection between the STA1 and the STA2 based on the second peer capability information;

wherein at least one of the first peer or the second peer capability information comprises data indicative of a capability of the STA1 for Direct Link Setup (DLS); and wherein at least one of the first peer or second peer capability information includes information defined in an Extensible Markup Language (XML) schema.

2. The method of claim 1, wherein at least one of the first peer and the second peer capability information is stored on at least one of: a non-removable memory, a removable memory, or a removable module.

3. The method of claim 1, wherein at least one of the first peer or the second peer capability information comprises at least one of a netmask, an indication of direct link setup, or a static internet protocol "IP" address if a dynamic host configuration protocol "DHCP" based IP address is not available.

4. A first peer wireless station (STA1) for peer-to-peer (P2P) communication in a wireless local area network (WLAN), the STA1 comprising:
   a memory; and
   at least one hardware processor communicatively coupled with the memory and configured to:
      communicate, first peer capability information to a second peer wireless station (STA2) using a capability discovery protocol request, wherein the first peer capability information describes the STA1's capability information for a P2P connection between the STA1 and the STA2;
      receive a second peer capability information from the STA2 using a capability discovery protocol response, wherein the second peer capability information describes the STA2's capability information for the P2P connection, wherein the second peer capability information includes a counter-proposal of the first peer capability information sent by the STA1 based on a capability of the STA2 for P2P communication; and
      establish the P2P connection between the STA1 and the STA2 based on the second peer capability information;

wherein at least one of the first peer or the second peer capability information comprises data indicative of a capability of the STA1 for Direct Link Setup (DLS); and wherein at least one of the first peer or the second peer capability information includes information defined in an Extensible Markup Language (XML) schema.

5. The STA1 of claim 4, wherein the first peer capability information is stored on at least one of: a non-removable memory, a removable memory, or a removable module.

6. The STA1 of claim 4, wherein the peer capability information comprises at least one of a netmask, an indication of direct link setup, or a static internet protocol "IP" address if a dynamic host configuration protocol "DHCP" based IP address is not available.

7. A non-transitory computer-readable medium containing instructions which, when executed, cause a first peer wireless station (STA1) for peer-to-peer (P2P) communication in a wireless local area network (WLAN) to perform operations comprising:
   transmitting first peer capability information to a second peer wireless station (STA2) using a capability discovery protocol request, wherein the first peer capability information describes the STA1's capability information for a P2P connection between the STA1 and the STA2;
   receiving a second peer capability information from the STA2 using a capability discovery protocol response, wherein the second peer capability information describes the STA2's capability information for the P2P connection, wherein the second peer capability information includes a counter-proposal of the first peer capability information sent by the STA1 based on a capability of the STA2 for P2P communication; and
   establishing, by the STA1, the P2P connection between the STA1 and the STA2 based on the second peer capability information;

wherein at least one of the first peer or the second peer capability information comprises data indicative of a capability of the STA1 for Direct Link Setup (DLS); and wherein at least one of the first peer or the second peer capability information includes information defined in an Extensible Markup Language (XML) schema.

8. The non-transitory computer-readable medium of claim 7, wherein the first peer capability information is stored on at least one of: a non-removable memory, a removable memory, or a removable module.

9. The non-transitory computer-readable medium of claim 7, wherein the first peer capability information comprises at least one of a netmask, an indication of direct link setup, or a static internet protocol "IP" address if a dynamic host configuration protocol "DHCP" based IP address is not available.

* * * * *